United States Patent
Endress et al.

(10) Patent No.: US 11,626,991 B2
(45) Date of Patent: Apr. 11, 2023

(54) METHODS AND SYSTEMS FOR AUTOMATIC OBJECT RECOGNITION AND AUTHENTICATION

(71) Applicant: Merck Patent GmbH, Darmstadt (DE)

(72) Inventors: Thomas Endress, Munich (DE); Daniel Szabo, Darmstadt (DE); Frederic Berkermann, Darmstadt (DE)

(73) Assignee: MERCK PAIENT GMBH, Darmstadt (DE)

( * ) Notice: Subject to any disclaimer, the term of this patent is extended or adjusted under 35 U.S.C. 154(b) by 526 days.

(21) Appl. No.: 16/214,825

(22) Filed: Dec. 10, 2018

(65) Prior Publication Data
US 2019/0334723 A1 Oct. 31, 2019

Related U.S. Application Data

(63) Continuation of application No. 16/023,590, filed on Jun. 29, 2018, now Pat. No. 10,193,695.

(30) Foreign Application Priority Data

Apr. 30, 2018 (EP) ...................................... 8170047

(51) Int. Cl.
*H04L 9/32* (2006.01)
*G06N 20/00* (2019.01)
(Continued)

(52) U.S. Cl.
CPC .......... *H04L 9/3236* (2013.01); *G06K 9/6256* (2013.01); *G06N 20/00* (2019.01);
(Continued)

(58) Field of Classification Search
CPC .... G06K 9/00577; G06K 9/62; G06K 9/6217; G06K 9/6255; G06K 9/6257; G06K 9/00201
See application file for complete search history.

(56) References Cited

U.S. PATENT DOCUMENTS 7,366,902 B2 * 4/2008 Bakke ..................... G06F 21/80
  713/168
7,404,007 B2 * 7/2008 Wilcock ................ G06Q 30/02
  709/213

(Continued)

FOREIGN PATENT DOCUMENTS

EP  1 927 934 A2  6/2008
EP  2 921 989 A1  9/2015
(Continued)

OTHER PUBLICATIONS

Extended European Search Report issued in related application EP 18170047.7, dated Oct. 18, 2018, 7 pages.
(Continued)

*Primary Examiner* — Richard A McCoy
(74) *Attorney, Agent, or Firm* — Faegre Drinker Biddle & Reath LLP

(57) ABSTRACT

A system and a method of receiving object data representing one or more discriminating characteristics of a physical object or group of physical objects is described herein. The method includes: processing the object data by means of a machine-learning-based object recognition process to obtain discriminating data representing one or more collision resistant virtual representations of the physical object or group of physical objects; comparing at least one of the discriminating data and an original hash value derived therefrom by application of a pre-determined cryptographic hash function thereto with corresponding reference data stored in one or more data repositories with restricted access; and, if said comparison with the reference data results in a match, outputting digitally signed identification data comprising said hash value.

9 Claims, 8 Drawing Sheets

(51) Int. Cl.
*H04L 9/06* (2006.01)
*G06K 9/62* (2022.01)
*G06V 20/64* (2022.01)
*G06V 20/80* (2022.01)
*G06V 20/00* (2022.01)
*H04L 9/00* (2022.01)

(52) U.S. Cl.
CPC .............. *G06V 20/64* (2022.01); *G06V 20/80* (2022.01); *H04L 9/0637* (2013.01); *H04L 9/3239* (2013.01); *G06V 20/95* (2022.01); *H04L 9/3247* (2013.01); *H04L 9/50* (2022.05)

(56) References Cited

U.S. PATENT DOCUMENTS

| | | | |
|---|---|---|---|
| 8,534,544 B1* | 9/2013 | Eker | G06K 19/10 235/375 |
| 10,664,722 B1* | 5/2020 | Sharma | G06K 9/6256 |
| 2005/0131660 A1 | 6/2005 | Yadegar et al. | |
| 2011/0082824 A1 | 4/2011 | Allison et al. | |
| 2011/0218973 A1* | 9/2011 | Pendlebury | G06F 16/1748 707/692 |
| 2012/0041887 A1* | 2/2012 | Hurme | G06Q 30/0185 29/592 |
| 2014/0032602 A1* | 1/2014 | Humprecht | H04L 63/20 707/E17.005 |
| 2014/0189890 A1* | 7/2014 | Koeberl | H04L 9/0866 726/34 |
| 2016/0048738 A1 | 2/2016 | He et al. | |
| 2016/0098723 A1 | 4/2016 | Feeney | |
| 2016/0267369 A1* | 9/2016 | Picard | G06K 7/1434 |
| 2017/0286735 A1* | 10/2017 | Lazzouni | G06Q 30/018 |
| 2018/0082481 A1* | 3/2018 | Wade | G06T 19/006 |
| 2018/0136633 A1* | 5/2018 | Small | G06Q 20/065 |
| 2019/0138778 A1* | 5/2019 | Lohar | G06K 9/00577 |

FOREIGN PATENT DOCUMENTS

| | | |
|---|---|---|
| EP | 2 999 156 A1 | 3/2016 |
| WO | 2005/032831 A1 | 4/2005 |
| WO | 2005/080088 A1 | 9/2005 |
| WO | 2007/031908 A2 | 3/2007 |
| WO | 2008/080414 A1 | 7/2008 |
| WO | 2017/201489 A1 | 11/2017 |

OTHER PUBLICATIONS

Popov, "The Tangle", IOTA Whitepaper for Jinn Labs, Version 1.3, Oct. 1, 2017, pp. 1-28.

* cited by examiner

METHODS AND SYSTEMS FOR AUTOMATIC OBJECT RECOGNITION AND AUTHENTICATION

CROSS-REFERENCE TO RELATED APPLICATIONS

This application is a continuation of U.S. patent application Ser. No. 16/023,590 (now issued U.S. Pat. No. 10,193,695), filed Jun. 29, 2018, which claims priority to European Application No. 18170047.7, filed Apr. 30, 2018, the disclosures of which are incorporated herein in their entirety by reference.

FIELD OF THE INVENTION

The present invention relates to the field of tracing and anti-counterfeit protection of objects, such as products like for example pharmaceutical products or other health-related products, and particularly to an automatic recognition and authentication of such objects. Specifically, the invention is directed to a method and a system for automatic object recognition, a method of training such a system, a method of authenticating an object with an object authentication device being in communication with said system, and such an object authentication device itself, as well as related computer programs corresponding to said methods. Moreover, the invention relates to a system for automatic object authentication comprising said system for automatic object recognition and one or more of said object authentication devices, which system for automatic object authentication may particularly serve as an anti-counterfeit protection and product tracing system.

BACKGROUND

In many industries, counterfeiting of products is a substantial problem that significantly impacts not only the revenues of original product manufacturers, but may even pose a serious threat to health and even life of consumers or operators of counterfeited, i.e. fake products. Such safety relevant product categories include in particular parts for automobiles and aircraft, components for the construction of buildings or other infrastructure, food, and even medical devices and pharmaceuticals.

Furthermore, in a broad range of different industries traceability of goods and physical objects is a key requirement. This applies in particular to logistics and supply chain infrastructures and to highly regulated/structured work flow environments. Examples are industry work places being controlled by official regulators such as the FDA (US Food & Drug Administration), and/or being certified e.g. according to GMP (Good manufacturing practice), GLP (Good laboratory practice), GCP (Good clinical practice), or DIN ISO or similar other standards and rules. Each of these regulated environments requires in particular an audit trail and auditable technologies. A further example is the traceability of high value products such as industrial spare parts in order to proof authenticity and intended use of these parts in secondary markets.

In order to limit counterfeiting and provide supply chain and work flow integrity, including recognition and authentication of products within work flows and supply chains, various industries have developed a number of different protection measures and identification solutions. Broadly used protection measures comprise adding a so-called security feature to a product, the feature being rather difficult to fake. For example, holograms, optically variable inks, security threads and embedded magnetic particles are known security features which are difficult to reproduce by counterfeiters. While some of these security features are "overt", i.e. can be easily seen or otherwise recognized by a user of the product, other security features are "covert", i.e. they are hidden and can only be detected by using specific devices, such as sources of UV-light, spectrometers, microscopes or magnetic field detectors, or even more sophisticated forensic equipment. Examples of covert security features are in particular printings with luminescent ink or ink that is only visible in the infrared part of the electromagnetic spectrum but not in its visible part, specific material compositions and magnetic pigments.

A specific group of security features, which are in particular used in cryptography, is known as "Physical Unclonable Functions" (PUFs). PUFs are sometimes also referred to as "Physically Unclonable Functions" or "Physical Random Functions". A PUF is a physical entity that is embodied in a physical structure and is easy to evaluate but hard to predict, even for an attacker with physical access to the PUF. PUFs depend on the uniqueness of their physical microstructure, which typically includes a random component that is already intrinsically present in the physical entity or is explicitly introduced into or generated in the physical entity during its manufacturing and which is substantially uncontrollable and unpredictable. Accordingly, even PUFs being produced by the exact same manufacturing process differ at least in their random component and thus can be distinguished. While in most cases, PUFs are covert features, this is not a limitation and overt PUFs are also possible. PUFs are furthermore ideal for enabling passive (i.e. without active broadcasting) identification of physical objects.

PUFs are known in particular in connection with their implementation in integrated electronic circuits by way of minimal unavoidable variations of the produced microstructures on a chip within given process-related tolerances, and specifically as being used for deriving cryptographic keys therefrom, e.g. in chips for smartcards or other security related chips. An example of an explanation and application of such chip-related PUFs is disclosed in the article "Background on Physical Unclonable Functions (PUFs)", Virginia Tech, Department of Electrical and Computer Engineering, 2011, which is available in the Internet at the hyperlink: http://rijndael.ece.vt.edu/puf/background.html.

However, also other types of PUFs are known, such as random distributions of fibers in paper used as a substrate for making banknotes, wherein the distribution and orientation of fibers can be detected by specific detectors and used as a security feature of the banknote. In order to evaluate a PUF, a so-called challenge-response authentication scheme is used. The "challenge" is a physical stimulus applied to the PUF and the "response" is its reaction to the stimulus. The response is dependent on the uncontrollable and unpredictable nature of the physical microstructure and thus can be used to authenticate the PUF, and thus also a physical object of which the PUF forms a part. A specific challenge and its corresponding response together form a so-called "challenge-response pair" (CRP).

An anti-counterfeit protection system based on using PUFs to authenticate products is described in each of the two European Patent Applications EP 16205928.1 and EP 16205920.8, each of which is incorporated herein in its entirety by way of reference.

Asymmetric cryptography, sometimes also referred to as "public key cryptography" or "public/private key cryptography" is a known technology based on a cryptographic system that uses pairs of keys, wherein each pair of keys comprises a public key and a private key. The public keys may be disseminated widely and are usually even publicly available, while the private keys are kept secret and are usually only known to their owner or holder. Asymmetric cryptography enables both (i) authentication, which is when the public key is used to verify that a holder of the paired private key originated a particular information, e.g. a message or stored data containing the information, by digitally signing it with his private key, and (ii) protection of information, e.g. a message or stored data, by way of encryption, whereby only the owner/holder of the paired private key can decrypt the message encrypted with the public key by someone else.

Recently, blockchain technology has been developed, wherein a blockchain is a public ledger in the form of a distributed database containing a plurality of data blocks and which maintains a continuously-growing list of data records and is hardened against tampering and revision by cryptographic means. A prominent application of blockchain technology is the virtual Bitcoin currency used for monetary transactions in the Internet. A further known blockchain platform is provided for example by the Ethereum project. In essence, a blockchain can be described as a decentralized protocol for logging transactions between parties, which transparently captures and stores any modifications to its distributed database and saves them "forever", i.e. as long as the blockchain exists. Storing information into a blockchain involves digitally signing the information to be stored in a block of the blockchain. Furthermore, maintaining the blockchain involves a process called "blockchain mining", wherein so-called "miners" being part of the blockchain infrastructure, verify and seal each block, such that the information contained therein is saved "forever" and the block can no longer be modified.

A further new ledger technology is known by the name of the "Tangle", which is blockless and permissionless distributed ledger architecture, which is scalable, lightweight, and provides a consensus in a decentralized peer-to-peer system. A prominent related technology using the Tangle as a technical basis is known as "IOTA", which is a transactional settlement and data integrity layer for the Internet of Things.

SUMMARY OF THE INVENTION

It is an object of the present invention to provide an improved way of effectively recognizing and authenticating a physical object, such as a product.

A solution to this problem is provided by the teaching of the appended independent claims. Various preferred embodiments of the present invention are provided by the teachings of the dependent claims.

Furthermore, a whole object authentication solution is presented herein, including a method and a system for object recognition, a method of training such system, and a device for object authentication and related methods and corresponding computer programs, as different aspects that may form part of an overall multi-component object authentication solution for effectively protecting physical objects against counterfeiting and tampering.

A first aspect of the object authentication solution provided herein is directed to a method of automatic object recognition. The method comprises (i) receiving object data representing one or more discriminating characteristics of a physical object or group of physical objects; (ii) processing the object data by means of a machine-learning-based object recognition process to obtain discriminating data representing one or more collision resistant virtual representations of the physical object or group of physical objects; (iii) comparing at least one of the discriminating data and an original hash value derived therefrom by application of a predetermined cryptographic hash function thereto with corresponding reference data stored in one or more data repositories with restricted access; and (iv) if said comparison with the reference data results in a match, i.e. a congruence with respect to one or more predefined matching criteria, outputting digitally signed identification data comprising said hash value.

Optionally, the identification data may comprise further information, such as for example time or location data or other metadata being related to the recognized object or group of objects and/or circumstances of the recognition process.

The matching criteria may particularly be defined such that a "match" results, if the discriminating data or the original hash value, or both, or a predefined combination thereof, is contained in or otherwise represented by the reference data.

The term "physical object", as used herein, refers to any kind of physical object, in particular to any kind of man-made product, such as for example and without limitation a pharmaceutical product or other health-related product, or a natural object, such as for example and without limitation a vegetable or a piece of a natural raw material; or a packaging of any one or more of the foregoing. A physical object may itself comprise multiple parts, e.g. both a consumable good and a packaging thereof.

The term "authentication", as used herein, refers confirming the truth of an attribute of a physical object, particularly its kind and its originality, claimed true by an entity.

The term "object data", as used herein, refers to data describing or otherwise representing a related object or group of objects, including by one or more discriminating characteristics thereof. Herein, the term "discriminating characteristics" refers to at least one characteristic property of the object or group of objects, which is suitable for distinguishing the object or group of objects from others in an at east substantially collision resistant or even bijective way.

The term "machine-learning-based object recognition process", as used herein, refers to a process where one or more computers are employed to recognize a physical object or group of physical objects based on input data, such as sensory data (e.g. image or video data captured by one or more cameras serving as sensors), characterizing the object or group of objects, and with the help of one or more machine-learning-based algorithms. In the context of the present invention, said "object data" is used as input data. Machine learning is an application of artificial intelligence (AI) that provides systems the ability to automatically learn and improve from experience without being explicitly programmed. Without limitation, machine-learning may comprise (i) supervised learning, wherein the computer is presented with example inputs and their desired outputs, given by a "teacher", and the goal is to learn a general rule that maps inputs to outputs; (ii) semi-supervised learning, wherein the computer is given only an incomplete training signal: a training set with some (often many) of the target outputs missing; (iii) active learning, wherein the computer can only obtain training labels for a limited set of instances (based on a budget), and also has to optimize its choice of objects to acquire labels for; (iv) reinforcement learning, wherein training data (in form of rewards and punishments) is given only as feedback to the program's actions in a dynamic environment, such as driving a vehicle or playing a game against an opponent; or (v) unsupervised learning, wherein no labels are given to the learning algorithm, leaving it on its own to find structure in its input.

The term "collision resistant virtual representation" of a physical object or group of physical objects, as used herein, refers to a data representation thereof, which is defined such that it is difficult, particularly nearly impossible in practice, to find two, at least substantially, different objects or groups of objects such that their respective data representations are equal, i.e. indistinguishable.

The term "cryptographic hash function", as used herein, refers to a special type of hash function, i.e. of a mathematical function or algorithm that maps data of arbitrary size to a bit string of a fixed size (a hash value), which is designed to also be a one-way function, i.e. a function that is easy to compute on every input, but hard to invert given the image of a random input. Preferably, the cryptographic hash function is a so-called "collision resistant" hash function, i.e. a hash function that is designed such that it is difficult, particularly nearly impossible in practice, to find two different data sets d1 and d2 such that hash(d1)=hash(d2). Prominent examples of such hash functions are the hash functions of the SHA-family, e.g. the SHA-3 function or the hash functions of the BLAKE family, e.g. the BLAKE2 function. In particular, so-called "provably secure cryptographic hash functions" may be used. These are hash functions for which a certain sufficient security level can be mathematically proven. In the object authentication solution of the present invention, the security of the cryptographic hash function may be further improved by the fact, that the analysis of the product or group of products to be examined, takes place at a particular location and time, where the physical object or group of objects is actually present at such location and time. This can be used either to increase the absolute level of security that can be achieved or to allow for the use of cryptographic hash functions working with smaller data sets, e.g. shorter data strings as inputs and/or outputs, while still providing a given required security level.

The term "digital signature" or "digitally signing" etc., as used herein, refers to (using) a set of one or more digital values that confirms the identity of a sender or originator of digital data and the integrity of the later. To create a digital signature, a hash value is generated from the data to be protected by way of application of a suitable cryptographic hash function. This hash value is then encrypted with a private key (sometimes also called "secure key") of an asymmetric cryptographic system, e.g. based on the RSA cryptographic system, wherein the private key is typically known only to the sender/originator. Usually, the digital signature comprises the digital data itself as well as the hash value derived from it by the sender/originator. A recipient may then apply the same cryptographic hash function to the received digital data, use the public key corresponding to said private key to decrypt the hash value comprised in the digital signature, and compare the decrypted hash value from the digital signature with the hash value generated by applying the cryptographic hash function to the received digital data. If both hash values match, this indicates that the digital information has not been modified and thus its integrity has not been compromised. Furthermore, the authenticity of the sender/originator of the digital data is confirmed by way of the asymmetric cryptographic system, which ensures that the encryption using the public key only works, if the encrypted information was encrypted with the private key being mathematically paired to that public key. The representation of the digital signature may particularly be implemented using an RFID transmitter or a single- or multi-dimensional barcode, such as a QR-Code or a DATA-MATRIX-code or simply as a multi-digit number.

The term "data repository with restricted access" refers to a data storage, such as a database, where the data stored therein can only be accesses upon prior authorization, particularly authentication of the entity or person attempting the access. Without limitation, such restricted access may be implemented by means of a password protection or even a two-factor or multiple-factor authentication, e.g. by a plurality of independently provided passcodes or other means of identification, such as a digital signature.

This method of authenticating an object defines one of several aspects of an overall object authentication solution. Within the overall solution, it serves to recognize a physical object to be authenticated based on respective object data and by means of a machine learning-based object recognition process being applied thereto, and to return a hash code that according to previously generated and stored reference data corresponds to the recognized object and can thus be used for its identification. The object data may for example be received from an object authentication device as described below, which may form another component of the object authentication solution and is used—inter alia—for sensor-based acquisition of characteristic information describing the object. The returned hash code may then be used by the object authentication device for authenticating the object by means of a comparison involving the hash code or a derivative thereof one the one hand and corresponding independently acquired information pertaining to the object, such as identity information provided on or in connection with the object or group of objects itself, on the other hand.

In some embodiments, which similarly apply to the other aspects of the present solution, the physical object comprises one or more of the following items for consumption (consumable goods) or use: a pharmaceutical or cosmetic compound or composition; a medical device; a laboratory equipment; a spare part or component of a device or system; a pesticide or herbicide; a seeding material; a coating, ink, paint, dye, pigments, varnish, impregnating substance, functional additive; a raw material for additive manufacturing of products, a product of an additive manufacturing process, i.e. a 3D-printed product. In particular, all of these items have in common that there is a need to prevent counterfeiting, in order to avoid malfunctions, health threats or other risks.

A second aspect of the object authentication solution is directed to a method of training a system for automatic object recognition. The method comprises (i) receiving object data representing one or more discriminating characteristics of a physical object or group of physical objects; (ii) processing the object data by means of a machine-learning-based object recognition process to obtain original discriminating data representing one or more collision resistant virtual representations of the physical object or group of physical objects; and (iii) storing reference data comprising the original discriminating data and an original hash value derived therefrom by application of a pre-determined cryptographic hash function thereto into one or more data repositories with restricted access.

This method of training a system for automatic object authentication defines another aspect of said overall object authentication solution. Within the overall solution, it serves to generate and store the reference data and thus to prepare and thereby enable a system to perform the method of the first aspect in the course of authenticating a physical object or group of physical objects.

In the following, selected embodiments of this method of training a system are described, which may be arbitrarily combined with each other or with other aspects of the solution described herein, unless such combination is explicitly excluded, inconsistent or technically impossible.

In some embodiments, storing the reference data comprises storing the original discriminating data into a first one of the data repositories and storing the identification data into a separate second one of the data repositories such that neither the first nor the second data repository stores both the original discriminating data and the corresponding original hash value. The separation allows for storing the original discriminating data and the original hash value in different spatial locations, e.g. data centers, thus enabling for example distributed computing and distributed data storage. Furthermore, access to and controlling the data repositories may thus be separated, which allows for example outsourcing of the operation of one of the data repositories and achieving increased level of data security due to the separation of the original discriminating data and the corresponding original hash value.

In some embodiments, processing the object data to obtain said original discriminating data comprises generating, by means of performing one or more predefined modification operations, a plurality of collision resistant virtual representations of said physical object or group of physical objects, such that at least two of these virtual representations represent the same physical object or group of physical objects, but each at a different condition. Specifically, in some embodiments thereof said different conditions relate to one or more of the following: (i) different age points in the lifetime of said physical object or group of physical objects; (ii) different environmental conditions to which said physical object or group of physical objects might be exposed during detecting respective one or more discriminating characteristics thereof in a subsequent object authentication process. Such environmental conditions per item (ii) may for example specifically relate to one or more of illumination, temperature, air pressure or other parameters of the environment in which the object or group of objects might be located during an authentication process. The different age points per item (i) above may particularly be used to create respective virtual representations of the object or group of objects that relate to different ages thereof and can thus be used to improve the recognition of objects that typically suffer from aging affects. These embodiments may particularly be used to increase the reliability of the object recognition, specifically the success level of the object recognition, because altering effects related to aging or different environmental conditions are thus factored into the recognition process. In some related embodiments, at least one of the predefined modification operations is defined, at least in parts, by one or more tensors to be applied to a vector representation of the object data or of data derived from the object data. This allows for a particularly efficient and well-structured implementation, where only linear (and thus simple and fast operations) need to be performed. The different virtual representations may then each be used as discriminating data for the purposes of the comparison. For example, in the case of various virtual representations of the same object, but for different ages, the comparison may be performed for two or more of the virtual representations to examine whether at least one of them leads to a match and thus to a successful recognition of the object base on the related object data.

In some embodiments, storing the reference data comprises storing combined data, which is formed as a combination of the reference data and an additional adjunct value, which is defined independent from said reference data, into the one or more data repositories with restricted access. Particularly, this approach may be used in cases, where two or more data repositories are used and the respective data to be stored therein has to be distributed to one or more of them via one or more respective communication links. Adding the adjunct value serves to increase the entropy of the data to be communicated and thus increases the achievable level of protection against interception, such as for example brute-force attacks against the flow of data over a communication link or, if the adjunct value is also stored in the data repository, against the data repository itself.

In some related embodiments, the combined data is formed by: (i) combining said original discriminating data or said original hash value derived therefrom (on the one hand), with the adjunct value (on the other hand) in a predetermined reversible, i.e. injective, manner to obtain a combined value representing both; and (ii) including the combined value in the reference data. For example, and without limitation, in some of these embodiments, the combined data is formed by applying a cryptographic hash function to input data comprising both said original hash value and the adjunct value (an optionally further information) to obtain said combined value.

In some embodiments, processing the object data comprises processing data representing one or more of the following properties of the physical object or group of physical objects, respectively: (i) a characteristic biometric or physiological property of a living organism or group of living organisms forming at least a part of the physical object or group of physical objects, respectively; (ii) a characteristic electrical, magnetic, or electromagnetic property, e.g. color or wavelength; (iii) a characteristic acoustic property; (iv) a characteristic geometrical property; (v) a characteristic chemical property; (vi) a characteristic mechanical or thermodynamical property. These types of properties have the advantage that typically they may be automatically detected by means of respective existing types of sensors without a need for human involvement.

In some embodiments, the method further comprises iteratively re-training the system for automatic object recognition based on additional object data representing discriminating characteristics of a physical object or group of physical objects, for which respective original reference data has already been previously generated and stored in the one or more data repositories during a previous iteration step of training the system, wherein the additional object data serves as input data for said machine-learning-based object recognition process. In this way, the system can be effectively trained to improve its capabilities with respect to recognizing a given physical object or group of objects, such as the rate of correct recognitions (true positives, true negatives). Particularly, this may also involve improving its capabilities with respect to recognizing the object of group of objects under a (broader) range of different conditions, to the extent the respective object data of the various iterations corresponds to different situations or conditions, under which a sensor-based measurement of the respective object/group of objects for the purpose of generating the respective object data occurs.

In some embodiments, storing the reference data comprises one or more of the following: (i) storing the reference data in a digitally signed form into at least one of said data repositories; (ii) storing or causing one or more nodes of a blockchain environment to store the identification data in a digitally signed form into a block of a blockchain related to said blockchain environment; (iii) storing or causing one or more nodes of a blockless distributed ledger environment, such as for example a Tangle ledger environment, to store the identification data in a digitally signed form into at least one node of said blockless distributed ledger environment; (iv) storing the identification data in a digitally signed form into a storage of a Public/Private-Key environment. The digital signing serves as a protection measure based on which the originality of the stored data can be verified. The same applies particularly, when the stored data is retrieved and communicated over a communication link, e.g. to an object authentication device, as described herein. Furthermore, the storage in a Public/Private-Key environment adds encryption, such that the stored and/or communicated data is further protected thereby against interception.

Specifically, storing the identification data in a blockchain or in a blockless distributed ledger, e.g. a Tangle-based ledger, enables a secure, reliable storage of the reading results with very high data integrity, such that it is essentially impossible to manipulate or erase or otherwise taper with or lose such data, e.g. due to unintended or deliberate deletion or due to data corruption. Thus, the complete storage history remains available. Furthermore, the stored information can be accessed wherever access to the blockchain or blockless distributed ledger, respectively, is available. This allows for a safe and distributed storage and access to the stored identification data, e.g. for integrity verification or authentication purposes such as checking whether a claimed supplier of a product was in fact the originator of the product, or not. Based on one or more of these embodiments, the physical world, to which the objects to be authenticated belong, can be connected to the power of blockchain technology. Thus, a high degree of traceability of the origin and supply chain of physical objects, such as products, can be achieved.

In some embodiments of the method of the first aspect or the second aspect, the respective method is performed by a system comprising two or more separate devices, which collectively perform the method, and which are communicatively connected to each other by one or more data links being protected against unauthorized interception. The securing of the data links may particularly include data encryption. Also other protection measures are possible of course, e.g. physical protection (esp. against interception or destruction) in the case of physical data lines. Thus, the security of the system and the method may be increased, particularly in view of man-in-the-middle attacks.

A third aspect of the present solution is directed to a system for automatic object recognition, the system being configured to perform the method of one or more of the first and second aspects of the present solution, as described herein.

A fourth aspect of the present solution is directed to a computer program comprising instructions, which when executed on one or more processors of a system for automatic object recognition according to the third aspect causes the system to perform the method according to any one or both of the first and second aspects of the present solution.

Accordingly, the explanations provided above with respect to these methods apply mutatis mutandis to the system according to the third aspect and the computer program according to the fourth aspect of the present solution.

A fifth aspect of the present solution is directed to a method of authenticating an object with an object authentication device, comprising: (i) sensor-based detecting of one or more discriminating characteristics of a physical object or group of physical objects; (ii) generating object data representing said one or more discriminating characteristics of said physical object or group of physical objects; (iii) communicating said object data to a system according to the third aspect of the present solution; (iv) receiving digitally signed identification data from said system in response to said communicating of said object data; (v) reading a marking provided on or in combination with the physical object or group of physical objects, respectively, to obtain therefrom digitally signed, optionally also encrypted, identity information; (vi) verifying the correctness of each of the digital signature of the identification data and the digital signature of the identity information; (vii) comparing the received identification data with the obtained identity information to verify the authenticity of said object or group of objects based on the result of this comparison; and (viii) outputting authentication information indicating whether, according to the results of the verifications said physical object or group of physical objects was determined to be authentic.

Specifically, a determination of authenticity may require that both verifications are successful, i.e. that the digital signatures correctly identify the expected/claimed originator, e.g. the correct object recognition system and object originator (e.g. manufacturer in case of products) and the comparison of the received identification data with the obtained identity information results in a match according to one or more predetermined matching criteria. The term "verifying the correctness of a digital signature", as used herein, refers to the common approach of verifying the originality of a digital signature, particularly comprising reading it by applying the related public key of the assumed originator in order to examine whether it is original, i.e. signed with the related secret private key of said originator.

Particularly, the object authentication device, may be mobile device, e.g. a device being specifically designed for the purpose of authentication or a general-purpose device, like a smart phone or portable computer being specifically programmed to perform said method of authentication and using one or more of its sensors, e.g. a camera, a microphone or an RFID reader, for the detection of object data. The object authentication device may thus be a device that can be variably used at different locations, e.g. along a supply chain of products. It serves on the one hand as a device for generating object data relating to the object or group of objects to be authenticated, by means of sensor-based detection of one or more discriminating characteristics of same. The object data is then communicated to the system for object recognition, which may particularly be a central entity serving a plurality of object authentication devices, and which processes the object data by means of a machine-learning-based object recognition process to obtain original discriminating data representing one or more collision resistant virtual representations of the physical object or group of physical objects.

The system for object recognition further compares at least one of the discriminating data and an original hash value derived therefrom by application of a predetermined cryptographic hash function thereto with reference data stored in one or more data repositories with restricted access. If said comparison with the reference data results in a match, i.e. if the object or group of objects is recognized, the system outputs, specifically communicates to the respective object authentication device, digitally signed identification data comprising said hash value, i.e. identification data relating to the recognized object or group of objects.

The object authentication device then serves, on the other hand, as a device for actually authenticating the object or group of objects, i.e. for verifying its originality, by comparing the received identification data to the identity information obtained from the object or group of objects itself, e.g. from a barcode, RFID-chip or any other suitable marking provided on the object/group of objects or a packaging or other material provided therewith. Particularly, the marking may comprise an, optionally encrypted, representation of the digital signature of the identity information or a representation of a pointer indicating a location where said digital signature can be accessed.

If applied, the encryption of the representation of a digital signature and/or the representation of the pointer indicating a location where said digital signature can be accessed adds yet another level of security, because the respective representations first need to be decrypted, which requires knowledge of the encryption scheme and the correct cryptographic key, before the digital signature can be read. The encryption may particularly be based on a known symmetric or an asymmetric encryption scheme, e.g. according to the well-known AES (symmetric) or RSA (asymmetric) cryptographic schemes.

The term "pointer indicating a location where said digital signature can be accessed", as used herein, may be in particular a pointer to a local or remote database or to a server address or Internet address, e.g. a hyperlink or similar, at which the digital signature can be accessed, e.g. downloaded. The pointer may particularly be implemented using an RFID transmitter or a single- or multi-dimensional barcode, such as a QR-Code or a DATAMATRIX-code as its representation.

Specifically, in some embodiments, the comparison of the received identification data with the identity information is implemented by means of comparison of two respective hash values, i.e. the original hash value represented by the identification data and a corresponding hash vale obtained from/via the marking. If the two hash values match, this indicates that the physical object is authentic, and the marking has not been tampered with. Otherwise, i.e. if they do not match, this indicates that some sort of fraud might have happened since the originator applied the marking to the physical object.

In some embodiments, in case the authentication fails or determines a lack of authenticity, the object authentication device may output itself, or cause another entity to output, an alarm signal to indicate the failure or lack of authenticity, respectively, e. g. to a human user or to another device.

Thus, within the framework of the present solution, the object authentication device can interact with said system of object recognition to safely authenticate an object or group of objects. Therein, unlike in the PUF-based solutions referred to above, the objects to be authenticated do not need to be specifically marked with a PUF and the discriminating characteristics of the objects do not need to be defined and fixed upfront but may instead be determined and continuously refined by the machine-learning-based recognition process used by said system of object recognition.

In the following, further selected embodiments of the object authentication method are described, which may be arbitrarily combined with each other or with other aspects of the present solution described herein, unless such combination is explicitly excluded, inconsistent or technically impossible.

In some embodiments, said sensor-based detecting of one or more discriminating characteristics of the physical object or group of physical objects comprises detecting at least one discriminating characteristic that is, at least substantially, invariant under variations of the environmental conditions at which said at least one discriminating characteristic is being detected. This may be the case, for example, if the discriminating characteristics is provided by an object-specific characteristic signal emitted by an RFID-label attached to the object. Also, specific properties of the material of the object may in some instance show such invariances. In this way the reliability of the overall object authentication process may be safeguarded.

In some embodiments, the method further comprises: including the original hash value or another object-specific information contained in the identification data into the output authentication information. This may serve multiple purposes. In particular, this may be used to inform a user of the object authentication device about the original hash value or another object-specific information, respectively, if the authentication information is output at a man-machine-interface, such a display. Moreover, the output may serve to similarly inform another automated process, e.g. via a respective machine-to-machine interface.

Furthermore, in some related embodiments, the method further comprises a storing process, wherein the storing process comprises digitally signing and storing or causing another device, such as a separate and optionally even remotely located computer being configured to perform (i) blockchain mining or (ii) writing into a node of a blockless distributed ledger, respectively, to store said original hash value or said other object-specific information, or both, in the digitally signed form into (i) a block of a first blockchain or (ii) into a node of a first blockless distributed ledger, respectively. This enables a secure, reliable storage with very high data integrity, such that it is essentially impossible to manipulate or erase or otherwise taper with or lose such data, e.g. due to unintended or deliberate deletion or due to data corruption. Thus, the complete authentication history remains available. Furthermore, the stored information can be accessed wherever access to the blockchain is available. This allows for a safe and distributed storage and access to the stored data, e.g. for integrity verification purposes such as checking whether a supplier of a product (object) was in fact the originator of the product, or not. Based on this embodiment, the physical world, to which the objects belong, can be connected to the power of blockchain technology. Thus, a high degree of traceability of the origin and supply chain of physical objects, such as products, can be achieved.

In some related embodiments, the storage process further comprises: (i) reading a marking provided on or in connection with the physical object or group of objects to be authenticated or detecting one or more selected properties of said object or group of objects to obtain supplementary information relating thereto; and (ii) digitally signing and storing or causing another device to store said supplementary information in the digitally signed form into a block of second blockchain being separate from the first blockchain or into a node of a second blockless distributed ledger being separate from the first blockless distributed ledger. For example, the supplementary information may be supply chain-related information and may particularly comprise one or more of the following: (i) location information pertaining to a location where the supplementary information was acquired by the object authentication device; (ii) authentication information of a user of the object authentication device; (iii) time and/or date information indicating the point in time at which the supplementary information was acquired by the object authentication device; (iv) a product identification, serial number, and/or batch number of an object being marked by the marking; (v) a manufacturing date or an expiration date of an object being marked by the marking; (vi) information identifying a manufacturing location of the product etc.

These embodiments allow for additionally storing and thus saving the supplementary information, into a respective second blockchain, thus providing the advantages discussed in connection with the immediately preceding embodiment also in relation to the supplementary information. Using different blockchains or blockless distributed ledgers for the original hash value or said other object-specific information on the one hand and for the supplementary information on the other hand further provides the advantage of easily supporting a combination of an existing (second) block chain or blockless distributed ledger, respectively, for the supplementary information with an additional first blockchain or blockless distributed ledger, respectively, for the original hash value or said other object-specific information.

Accordingly, different access rights can be easily enabled and the management of the blockchains can be in the hands of different authorities. In particular, these embodiments may be used to verify both whether a supplier of a product was in fact its originator, and whether the supply chain was as expected, or not. Furthermore, this can be used for both (i) examining the marking/object in view of whether it has been counterfeited or tampered with, and (ii) reading from the marking and outputting additional information, such as supply-chain or other logistics information. In addition, however, the combination of both uses (i) and (ii) can be utilized to further increase the security aspect of the present object authentication solution, because such additional information, like supply chain information, can be used to retroactively identify locations or persons being involved in supply chain, where a potential fraud might have happened as well as potential related dates or time frames. Accordingly, an object authentication device adapted to perform the method of these embodiments is a dual-use or even multi-use device, which increases the ease of use and reduces the number of different devices needed to read the complete composite security marking.

In some related embodiments, the storage process further comprises in the blockchain case: (i) when storing said original hash value and/or said other object-specific information in a block of the first blockchain, including a cross-blockchain pointer, which logically maps the block of the first blockchain to a corresponding block of the second blockchain, into the block of the first blockchain; and (ii) when storing the supplementary information in a block of the second blockchain, including a cross-blockchain pointer, which logically maps the block of the second blockchain to a corresponding block of the first blockchain, into the block of the second blockchain.

Similarly, the storage process further comprises in the blockless distributed ledger case: (i) when storing said at least one of said hash values in a node of the first blockless distributed ledger, including a cross-ledger pointer, which logically maps the node of the first blockless distributed ledger to a corresponding node of the second blockless distributed ledger, into the node of the first blockless distributed ledger; and (ii) when storing the supplementary information in a node of the second blockless distributed ledger, including a cross-ledger pointer, which logically maps the node of the second blockless distributed ledger to a corresponding node of the first blockless distributed ledger, into the node of the second blockless distributed ledger.

In this way, the two blockchains or two blockless distributed ledgers, respectively, can be interconnected by the cross-blockchain pointers or cross-ledger pointers, respectively, which can be used to further increase the achievable security level of the present object authentication solution. In particular, this can be used to track down attempts of tampering with or counterfeiting marked objects at different points along a supply chain. For example, this embodiment allows for tracking down a location and/or a point in time of such an attempt or, in case of a mandatory authentication at the object authentication device, an identification of a user or entity being involved with such an attempt.

In some embodiments, the authentication information is output, at least in part, in the form of a one-dimensional or a multi-dimensional barcode, such as a DATAMATRIX code or a QR code. This enables the use of readily available barcode scanners for the further processing of the output authentication information, which may be particularly advantageous, where the object authentication device is integrated within or interacting with an automated production line or other processing line, where its outputs need to be further processed by algorithms processed by the line rather than by a human user.

In some embodiments, the method further comprises: if according to authentication information said physical object or group of physical objects was not determined to be authentic, repeating the method of object authentication until the earlier of (i) a successful authentication or (ii) a fulfillment of a predetermined termination criterion. For example, the termination criterion may be defined in terms of a number of failed authentication attempts.

In some embodiments, the method further comprises performing a user authentication and allowing or denying the user to perform an object authentication with said object authentication device based on the result of the user authentication. This can be advantageously used to further increase the security of the solution by preventing unauthorized users from successfully interacting with the object authentication device and thus getting involved in the security chain provided by the present solution. Furthermore, this can be used to acquire user identity or other user related information, which can be used to increase the transparency of the flow of physical objects, particularly products, to be authenticated along a supply chain. In case of security concerns, this information can then be used to track down potential threats to the security provided by the overall solution and to identify locations or persons which might be related to such threats.

In some embodiments, the method further comprises communicating the authentication information and/or the identification data, in whole or part, and/or further information derived therefrom, over a communication link to an opposing side. Particularly, the communication might be adapted to sending and receiving data over a wireline, wireless, or optical communication link, such as by way of example and without limitation a communication link based on wireless LAN, Bluetooth, cellular network or a classical telephone line. Such communication link may be used for a variety of different purposes, including for sending acquired information, e.g. the output authentication information, to an opposing side, which might for example be a central security instance, such as a trust center comprising a central security server, which might form a component of the present authentication solution.

In some related embodiments, the method further comprises capturing and sending security-related information over a communication link to an opposing side. Said opposing side might for example be said trust center mentioned above. In particular, such sending of security-related information may occur randomly or may be specifically triggered according to a predetermined trigger scheme or remotely, e.g. by the opposing side. This allows for a remote monitoring of the security status of the object authentication device itself, and/or of security-related events the object authentication device is involved in. Such a security-related event might for example be a detection of a marking/object that has been counterfeited or tampered with, according to the authentication information or other security-related information provided by the object authentication device.

Specifically, according to related embodiments, the security-related information comprises one or more of the following: (i) location information characterizing a current or past location of the object authentication device; (ii) user data characterizing or identifying a user of the object authentication device; (iii) network data characterizing the communication link; (iv) information characterizing an attempt or actual act detected by at least one sensor of the object authentication device or a corresponding reaction of the object authentication device (e.g. as described above); (v) authentication information generated by the object authentication device.

In some related embodiments, the method further comprises detecting a security event in information contained in a signal received from the opposing side over the communication link. In particular, this may be used to trigger a transition of the object authentication device into a safe mode or even its deactivation, in case an authorized opposing side, e.g. a central security center, sends information containing such security event to the object authentication device, in order to avoid any negative impact, the object authentication device might otherwise have on the overall authentication system. Such negative impact might result, for example, if any compromising act such as an unauthorized intrusion or firmware/software modification at the object authentication device or a use by an unauthorized person or at an unauthorized location has occurred and been communicated to or otherwise detected by the opposing side.

In some related embodiments, the method further comprises sensor-based detecting of one or more of the following as a security event: (i) an attempt or actual act of physical intrusion into the object authentication device; (ii) an attempt or actual act of locally or remotely accessing an internal control functionality of the object authentication device, wherein such access is not available to a user of the object authentication device in the course of its normal operation. Specifically, such attempted access might be directed to taking over control of the functionality of the object authentication device or to modifying same. Consequently, this embodiment may be advantageously used to further increase the security level of the present object authentication solution, and particularly to protect both the object authentication device itself and the whole solution presented herein against unauthorized intrusion and tampering.

In some related embodiments, the method further comprises performing one or more of the following security measures in reaction to detection of a security event: (i) locking the object authentication device such as to limit or prevent its further use; (ii) self-destroying at least one functional part of the object authentication device or destroying data stored therein in order to prevent its further use or access by a user; (iii) outputting an error message. In particular, the security measures may be considered specific measures for turning the object authentication device into a safe or mode or for deactivating it, as described above.

A sixth aspect of the present solution is directed to an object authentication device being adapted to perform the method of the fifth aspect.

In some embodiments, the object authentication device is integrated or otherwise forms a component of one or more of the following: a handheld device, e.g. a product or barcode scanning device; a production, quality control or commissioning equipment; a production or quality control or commissioning line; a flying object, e.g. a drone; a robot, e.g. an agricultural robot; an agricultural machine. This allows for an integration of the object authentication device's functionality into a system having additional or broader functionality, particularly in an automated or semi-automated manner. For example, in the case of a production quality control or commissioning line the object authentication device may be integrated into the line in such a way that it automatically reads the markings on the products running along the line in order to perform an initial capturing of the related data. That captured data may then be stored into a related database or compared to already stored data for the sake of verifying that the production or commissioning line produces respectively commissions the intended set of products. Similarly, at one of more nodes of a supply chain, such as logistics centers, such object authentication devices may be integrated inline into identification and transport systems, e.g. conveyors, in order to automatically or semi-automatically (e.g. in the case of a handheld device) check and verify the authenticity of the products, before shipping them to a next node in the supply chain. The same applies to a final node, i.e. to a recipient and/or end user of the products.

According to a further preferred embodiment, the object authentication device is a portable electronic communication terminal. Without limitation, the object authentication device may for example be a smart phone or portable computer, e.g. a tablet computer. A communication link to the system for object recognition may then be established using the communication capabilities which are anyway present in the electronic communication terminal, e.g. for cellular communication.

A seventh aspect of the present solution is directed to a computer program comprising instructions, which when executed on one or more processors of an object authentication device according to the sixth aspect causes the object authentication device to perform the method of the fifth aspect.

The computer programs of the fourth and/or the seventh may be particularly implemented in the form of a data carrier on which one or more programs for performing the respective method are stored. This may be advantageous, if the computer program product is meant to be traded as an individual product in individual product independent from the processor platform on which the one or more programs are to be executed. In another implementation, the computer program product is provided as a file on a data processing unit, particularly on a server, and can be downloaded via a data connection, e.g. the Internet or a dedicated data connection, such as a proprietary or local area network.

Accordingly, the explanations provided above with respect to the method of the fifth aspect applies mutatis mutandis to the object authentication device according to the sixth aspect and the computer program according to the seventh aspect of the present solution.

An eighth aspect of the present solution is directed to a system for automatic object authentication, comprising the system for automatic object recognition of the third aspect and an object authentication device of the sixth aspect, the system and the object authentication device being configured to collectively recognize and authenticate a physical object or group of physical objects.

BRIEF DESCRIPTION OF THE DRAWINGS

Further advantages, features and applications of the present object authentication solution are provided in the following detailed description and the appended figures, wherein.

Further advantages, features and applications of the present object authentication solution are provided in the following detailed description and the appended figures, wherein.

In the figures, identical reference signs are used for the same or mutually corresponding elements of the solution described herein.

DETAILED DESCRIPTION

Figure 1:
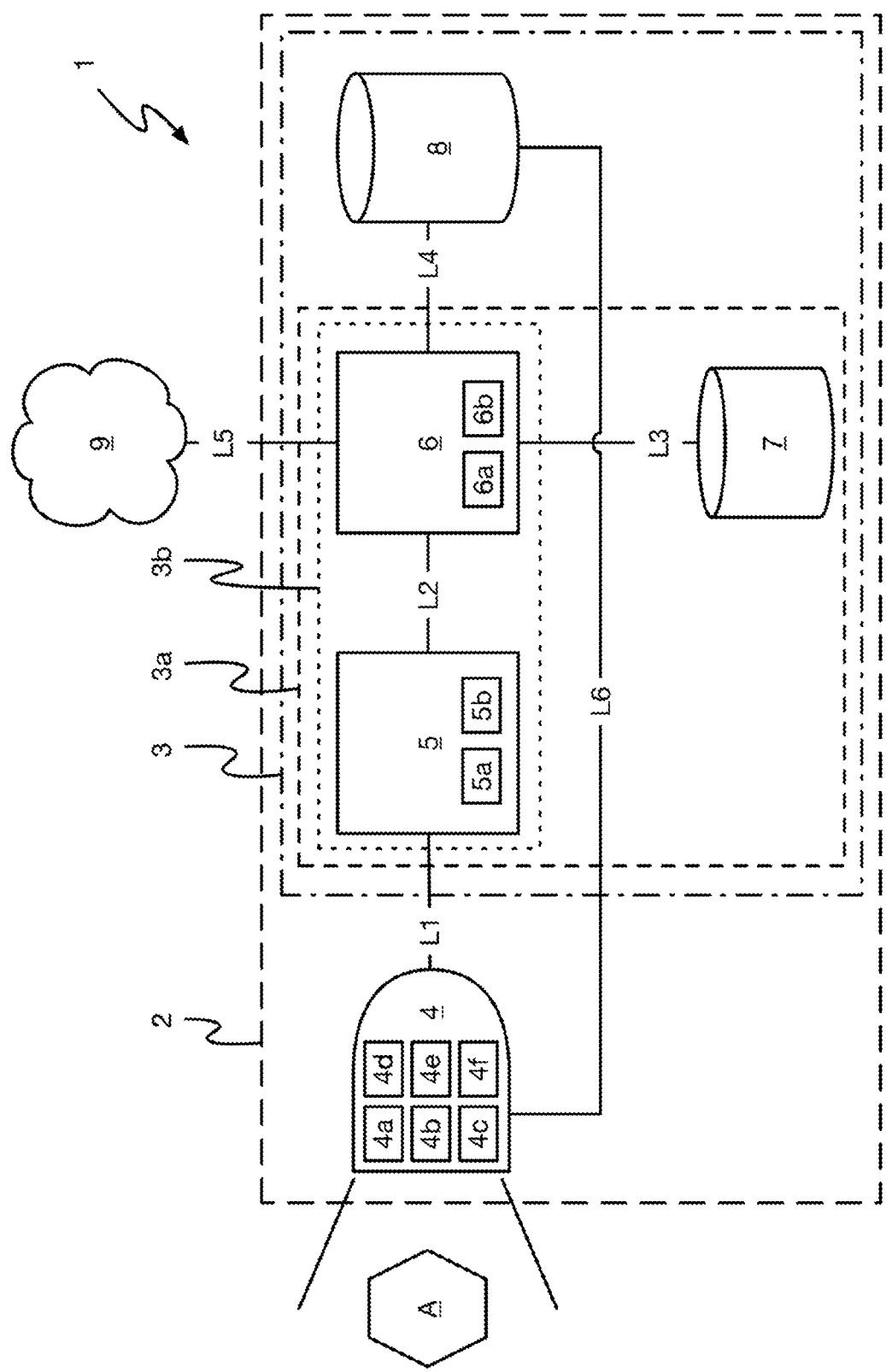
FIG. 1 schematically illustrates an overview of a preferred embodiment of the present object authentication solution, including a system for automatic object authentication.

FIG. 1 illustrates system aspects of an overall object authentication solution 1 according to a preferred embodiment of the present invention. Method aspects of the solution 1 will be described below with reference to the further figures. The solution 1 comprises a system 2 for automatic object authentication which in turn comprises one or more object authentication devices 4 (only one of them is shown), each of which may particularly be a mobile device, such as a mobile object authentication device or even a mobile computer, e.g. tablet computer, or smart phone having at least one sensor for capturing or measuring properties of a physical object A or a group of physical objects to be authenticated. Each of the object authentication devices 4 comprises a sensor unit 4a, a processing unit 4b, and a memory 4c. The memory 4c stores a computer program being configured to be executed on the processing unit 4b in order to control the respective object authentication device 4, including its sensor unit 4a, and in particular to cause the respective object authentication device 4 to perform an object authentication method, e.g. as described below with reference to FIGS. 4A/4B and 5A/5B. The object authentication device 4 may further comprise a security device 4d comprising one or more sensors for detecting a security event, such as an attempt or actual act of physical intrusion into the object authentication device 4, or an attempt or actual act of locally or remotely accessing without authorization an internal control functionality of the object authentication device 4. Preferably, the security device 4d interacts with or further comprises a security defense arrangement 4e to protect the object authentication device 4 in case a security event was detected. Particularly, the security defense arrangement 4e may be adapted to perform a step similar to step S5 of FIG. 4A, described in more detail below. For example, the security defense arrangement 4e may be configured to lock a user interface of the object authentication device 4 in case a security event is detected or to activate a self-destruction of a security chip contained in the object authentication device 4, in order to protect data stored therein, including for example a private cryptographic key or other security-relevant data such as authentication data. In addition to or instead of the security device 4d, the object authentication device 4 may comprise a monitoring device 4f, that is configured to detect a security event indicated in information contained in a signal received from an opposing side over said communication link. For example, in case such opposing side, e.g. a trust center, learns about a broader attempt to attack the security and integrity of object authentication devices 4 being distributed in the field, e.g. along a given supply chain, such signal may be used to proactively trigger a blocking (at least temporarily) of any further use of the object authentication devices 4 in the field in order to prevent tampering with the object authentication devices 4 by such attacks.

The system 2 for object authentication further comprises a system 3 for object recognition, which may particularly be implemented as a central backend system acting together with said one or more object authentication devices 4. The system 3 may in addition serve as the opposing side or trust center mention above in connection with the security aspects of the object authentication device 4.

The system 3 for object recognition comprises a recognition subsystem 3a, which in turn comprises a data analysis module 5, which is configured to analyze object data provided by one or more of the object authentication devices 4 using one or more machine-learning-based algorithms (e.g. one or more neural networks), which may particularly comprise algorithms for pattern recognition and the like. To that purpose, the data analysis module 5 comprises a processing unit 5a with one or more CPUs, and a memory 5b. The memory 5b stores one or more computer programs being configured to be executed on the processing unit 5a (or alternatively on a distributed processing platform (not drawn)) and to implement said one or more algorithms. The recognition subsystem 3a further comprises a data processing module 6 configured to further process outputs data of the data analysis module 5, as will be described in more detail below. To that purpose, the data processing module 6 comprises a processing unit 6a with one or more CPUs, and a memory 6b. The memory 6b stores one or more computer programs being configured to be executed on the data processing module 6 and to implement said data processing. The data analysis module and the data processing module 6 jointly form a data processing platform 3b of the recognition subsystem 3a. In fact, in some embodiments, the data analysis module and the data processing module 6 may be implemented jointly as a single module forming the data processing platform 3b, which may particularly and without limitation comprise only a single processing unit and a single memory.

The recognition subsystem 3a further comprises a first data repository 7, which may be implemented particularly as a database. As will be explained in more detail below, the first data repository 7 is configured to store and provide reference data resulting from the data processing performed by the data processing module 6 on the basis of analysis results being output by the data analysis module 5 in the course of training the system 3 for object recognition.

The system 3 for object recognition further comprises a second data repository 8, which is implemented separate from recognition subsystem 3a. The second data repository 8 is configured to store and provide a subset of reference data resulting from the data processing performed by the data processing module 6, as will be explained in detail below. External to the system 2 for automatic object authentication, the object authentication solution 1 may comprise an external data ledger 9, which may particularly be implemented by a blockchain environment, a blockless distributed ledger environment, or a PKI environment, or a combination of one or more of the aforementioned. Each of the above-mentioned components 4 to 9 are connected to each other, as shown in FIG. 1, by a set of secured data links L1 to L6. Each of the data links L1 to L5 may individually be selected to be of the wireline, wireless or optical type or any other suitable data transmission type. The securing of the data links may particularly include data encryption. Also, other protection measures are possible of course, e.g. physical protection (esp. against interception or destruction) in the case of physical data lines.

Figure 2:
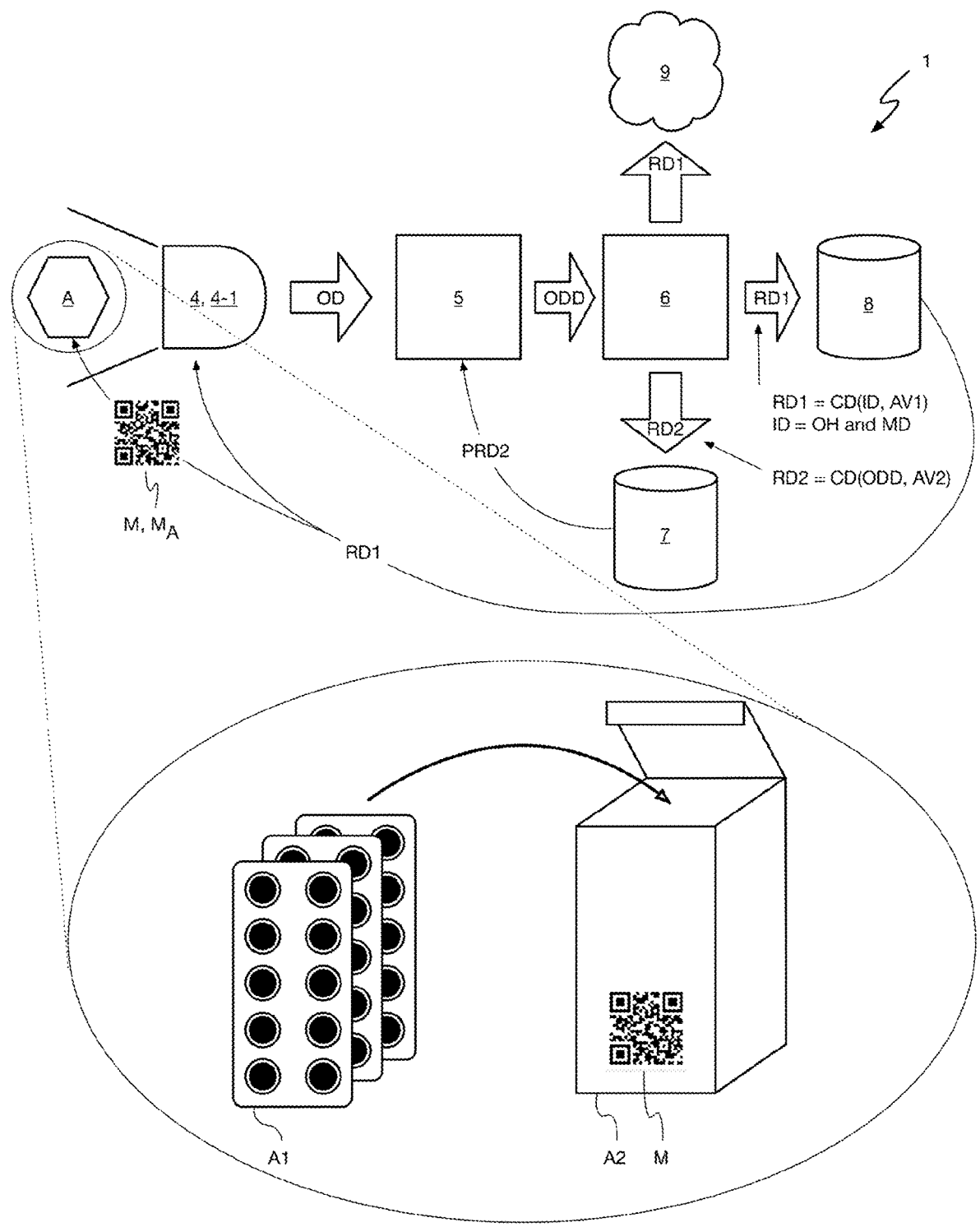
FIG. 2 schematically illustrates a method of training the system shown in FIG. 1, according to a preferred embodiment of the present object authentication solution and its application to a physical object comprising as consumable goods a set of pharmaceutical tablets arranged in blister packs and a related packaging for the blister packs.

FIG. 2 schematically illustrates a method of training the system 3 shown in FIG. 1, according to a preferred embodiment of the object authentication solution 1. In preparation of the training, an object authentication device 4, which in this case is typically a central object authentication device 4-1 provided at the location of the system 3, uses its sensor unit 4a to capture, particularly measure, properties of a known physical object A and output corresponding results in the form of object data OD. The object A may particularly be a product to be subsequently distributed and which is thus used in the training in order for it to be authenticable by the system 3 once the training is completed. The training is typically performed as part of the production or postproduction process of the respective product A, before its distribution to a supply chain.

The training may be either directed to a specific single instantiation of the object A or, alternatively, only to its product type in such a way that different instantiations of the same product type would lead to the same training results and thus these training results might be used to later authenticate any instantiation of products of such product type rather than only a specific individual product A. In the non-limiting example presented in FIG. 2, the product A is a multipart product comprising a plurality of consumable goods A1 in the form of a set of pharmaceutical tablets arranged in multiple blister packs, and a corresponding product packaging A2 for the blister packs of A1.

In the course of the training process, the data analysis module 5 receives the object data OD as an input and uses its machine learning-based one or more algorithms to analyze the object data in order to derive discriminating data representing one or more collision resistant virtual representations of the physical object A, based on the received object data OD. This derived discriminating data is in the following referred to as "original" discriminating data ODD, in order to distinguish it from similar discriminating data DD being generated in the course of a later authentication process. The original discriminating data ODD is then forwarded to the data processing module 6, where it is processed to the arrive reference data that may be used in a subsequent object recognition/authentication process as a reference. The processing may particularly comprise generating, by means of performing one or more predefined modification operations, a plurality of collision resistant virtual representations of the physical object A, such that at least two of these virtual representations represent the same physical object A, but each at a different condition. Different conditions may particularly refer to different age points in the lifetime of the object A or different environmental conditions the object might be exposed to in the future, such as different lighting, temperature or pressure conditions. This allows for creating reference data which provides a good match to discriminating derived from captured object data in a later object recognition process, even if said age or environmental conditions are substantially different than those at the time of training.

The generated reference data is then grouped into a first subset RD1 and a different second subset RD2 of the reference data, which are each digitally signed and stored in two different data repositories. In particular, the first subset RD1 is defined such as to comprise the output CD(ID, AV1) of a data combination function CD( ), which is configured to take identification data ID and a predefined first adjunct value AV1 as inputs and perform a data combination operation, such as concatenating, mixing and scrambling, or otherwise mathematically combining the inputs in a predetermined reversible manner, in order to generate said output. The identification data ID comprises at least a hash value OH being derived by application of a predetermined cryptographic hash function from the original discriminating data ODD, or parts thereof, and optionally metadata MD comprising additional information pertaining to the product or the training. In particular, the metadata MD may comprise information indicating a time or venue of the training, a user identity of a user operating the object authentication device 4 or an apparatus identity of that device 4, a serial number and/or production date or venue, or one or more preferable invariant properties of the object A. The adjunct value AV1, on the other hand, may be an arbitrary known value, even a random value, that is added as a further input to the combination function CD( ), in order to increase the entropy of the resulting first subset RD1 and thus enhance the security that may be achieved by encrypting or digitally signing RD1. In addition, the first subset RD 1 may be stored into the external data ledger 9, particularly for the purpose of creating redundancy and reduce the risk of data loss and for enhancing the accessibility of the RD1 data. In a similar manner, a second subset of reference data RD2 is generated by the data processing module 6, wherein RD2 comprises in particular information resulting from applying the same or a different data combination function CD( ) to the original discriminating data ODD, or parts thereof, and a second adjunct value AV2, wherein the latter serves a similar purpose as AV1 with respect to RD1.

Specifically, the training process may be defined to be iterative, in which case the data analysis module 5 receives a previous second subset of reference data PRD2, that was generated in a preceding training iteration pertaining to the same object A, as a further input when processing the object data OD. Following the training process or even as a part thereof, the first subset of reference data RD1, which includes the identification data ID is forwarded to the object authentication device 4-1 and/or is used to create a marking M, (respectively $M_A$ for product A, specifically), such as a one or multidimensional barcode, (e.g. a QR code or a data matrix code) or an RFID tag that is fixed or otherwise attached to or combined with the object A. The marking M, $M_A$ comprises a coding of the RD1 data. The so marked product A is then ready to be distributed into a supply chain and the system 3 is trained to recognize it again at a later occasion based on object data OD captured from product A at a later point in time and potentially a different venue.

Figure 3A:
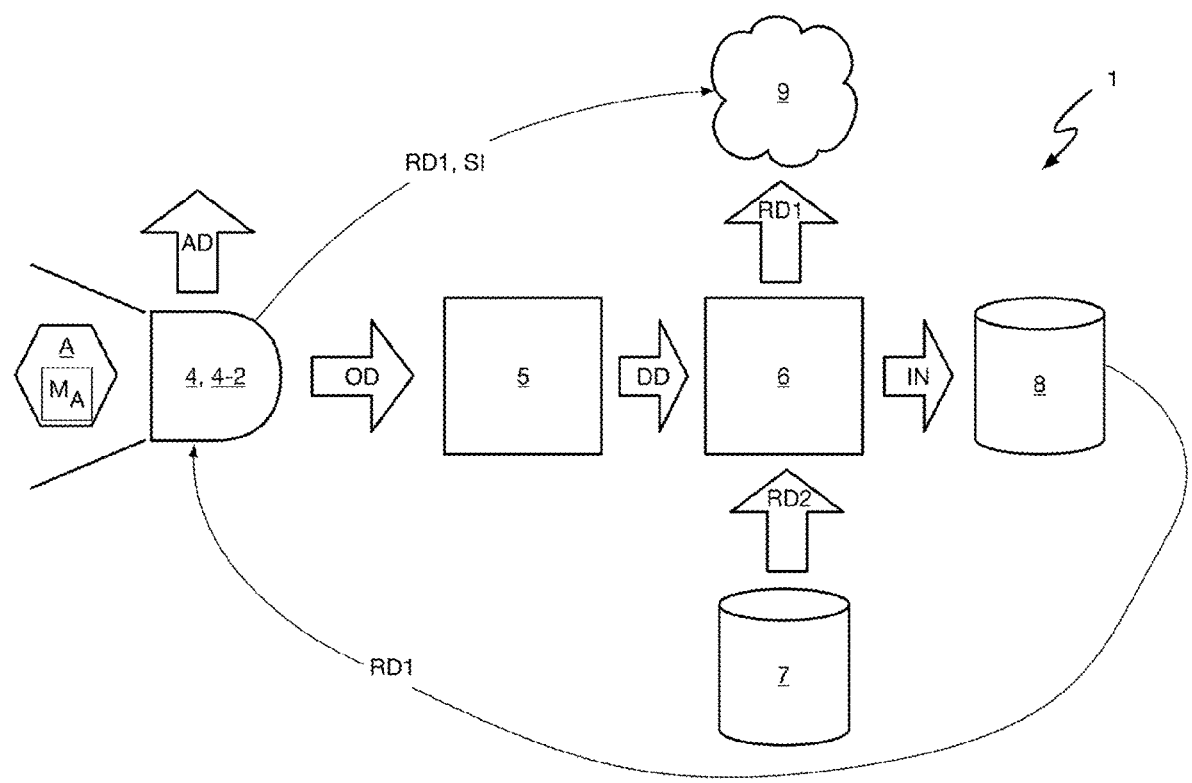
FIG. 3A schematically illustrates a method of automatic object recognition and authentication using the system shown in FIG. 1, according to a preferred embodiment of the present object authentication solution, in a case where an examined object is successfully recognized.
Figure 3B:
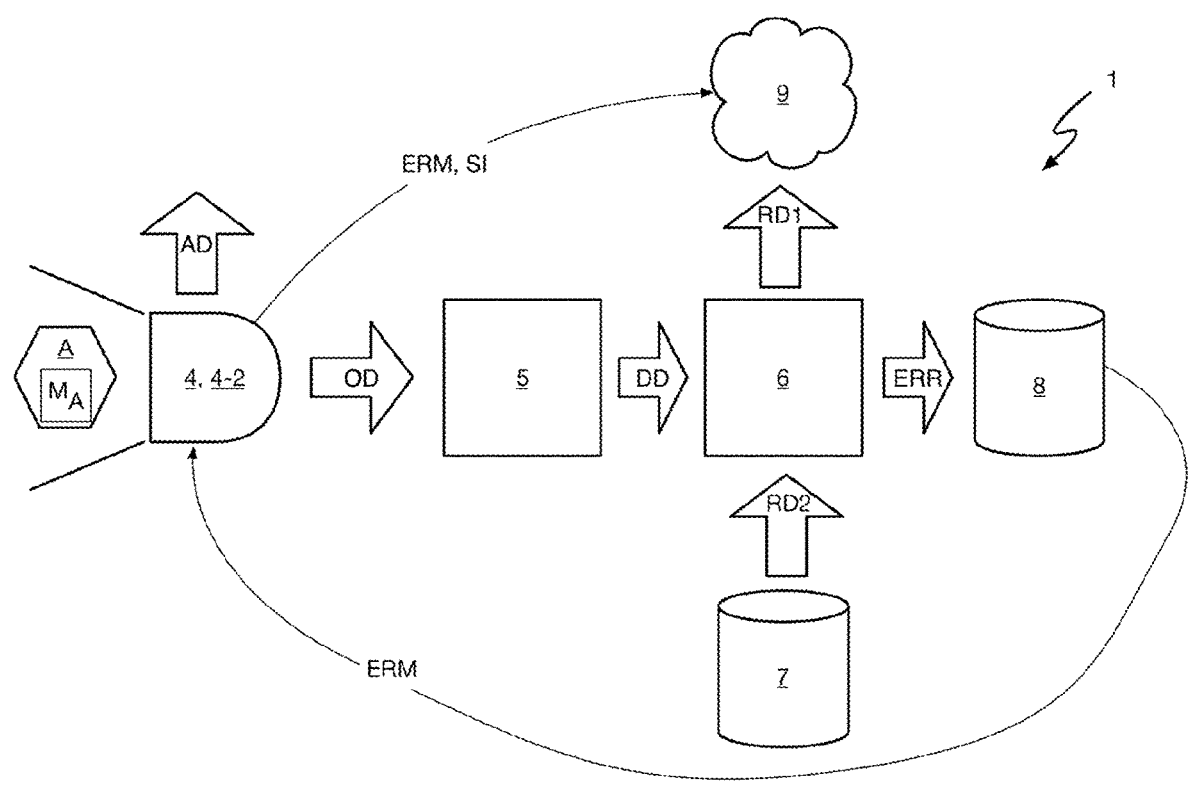
FIG. 3B schematically illustrates the same method of automatic object authentication as in FIG. 3A, but in a case wherein the examined object is not successfully recognized.

FIGS. 3A and 3B schematically illustrate a method of automatic object recognition and authentication using the system shown in FIG. 1, according to a preferred embodiment of the present authentication solution. FIG. 3A refers to a case, where an examined object A is being successfully recognized, while FIG. 3B refers to a case, where an examined object B is not being successfully recognized.

Referring to FIG. 3A, again an object authentication device 4 is used to capture/measure characteristic information relating to a physical object A, such as a product, to be investigated and to generate respective object data OD. However, now the object authentication device 4 will typically be an object authentication device 4-2 being specifically designed for use in the field rather than at the factory level, for example at a node of the supply chain, or in the course of a customs control, or anywhere else, where tracking and/or authentication of the product for the purpose of detecting counterfeiting is desirable. Accordingly, the object authentication device 4-2 will typically be different from the object authentication device 4-1 used during the training process described with reference to FIG. 2 above, which process is typically conducted at the factory level.

The object data is then sent over the datalink link L1 shown in FIG. 1 to the system 3 for automatic object recognition. In a similar manner, as described above for the training process, data analysis module 5 generates discriminating data DD and forwards them to the data processing module 6. The data processing module 6 accesses the first data repository 7 to retrieve the reference data RD2 stored therein during the training process and compares it to the discriminating data DD received from the data analysis module 5. This comparison may particularly be performed on the basis of (i) the original hash codes OH comprised in the RD2 reference data, usually in different object related data sets, each for one of a typically large plurality of different objects for which a training has been previously performed, and (ii) a corresponding hash code being derived from the discriminating data DD. If the comparison results in a match according to some predefined matching criteria for one of said object related data sets comprised in the RD2 reference data, which matching criteria in a simple case may require a mathematical equality of the two compared hash codes, the data processing module 6 forwards an index IN value pertaining to the object A respectively the data set for which the match has been found.

The second data repository 8 then selects and forwards the reference data subset RD1 corresponding to that object A according to the index IN to the object authentication device 4-2. As mentioned above, the digitally signed RD1 data comprises identification data pertaining to that object A. The process, as described until now, may be referred to as an object recognition process, because it results in identification data of the recognized object A being returned as a result.

This process, may however be extended to become an object authentication process, as described below in detail with reference to FIGS. 4A and 4B. As a result of the object authentication process, authentication data AD will be output by the object authentication device 4-2 and in a storage step, the received digitally signed RD1 data received from the second data repository 8, or at least selected identification information ID comprised in RD1, is stored into the external data ledger 9, e.g. a first blockchain. Optionally, also supplementary information SI may be stored in the same or a different external data ledger 9, e.g. a second blockchain, as described in more detail below. The supplementary information SI may particularly include information relating to one or more of the following: a time and/or venue of the object authentication performed by the object authentication device 4-2, a user identity of a user operating the object authentication device 4-2, an apparatus identity of that device 4-2, a serial number and/or production date or venue, or one or more preferable invariant properties of the object A, and an identity of the successfully authenticated object A, which identity is taken or derived from the identification data ID comprised in the received RD1 data.

FIG. 3B refers to a case, where unlike in FIG. 3A an examined object B is not being successfully recognized. This may for example be the case, if no previous training has been performed with respect to object B, or issues such as detection errors or data loss or errors arise during the authentication process. While the first part of the process may be similar to that of FIG. 3A, if a failed authentication is recognized, e.g. by the data processing module 6, an error signal ERR is forwarded to the second data repository 8 instead of the index IN and a corresponding error message ERM is sent to the object authentication device 4-2 to inform it of the failed authentication. The object authentication device 4-2 may then either repeat the process or output authentication data AD indicating the failure of the authentication attempt. In addition, the error message ERM or another equivalent information may be stored into the external data ledger, optionally again along with corresponding supplementary information SI, as described above with reference to FIG. 3A.

Figure 4A:
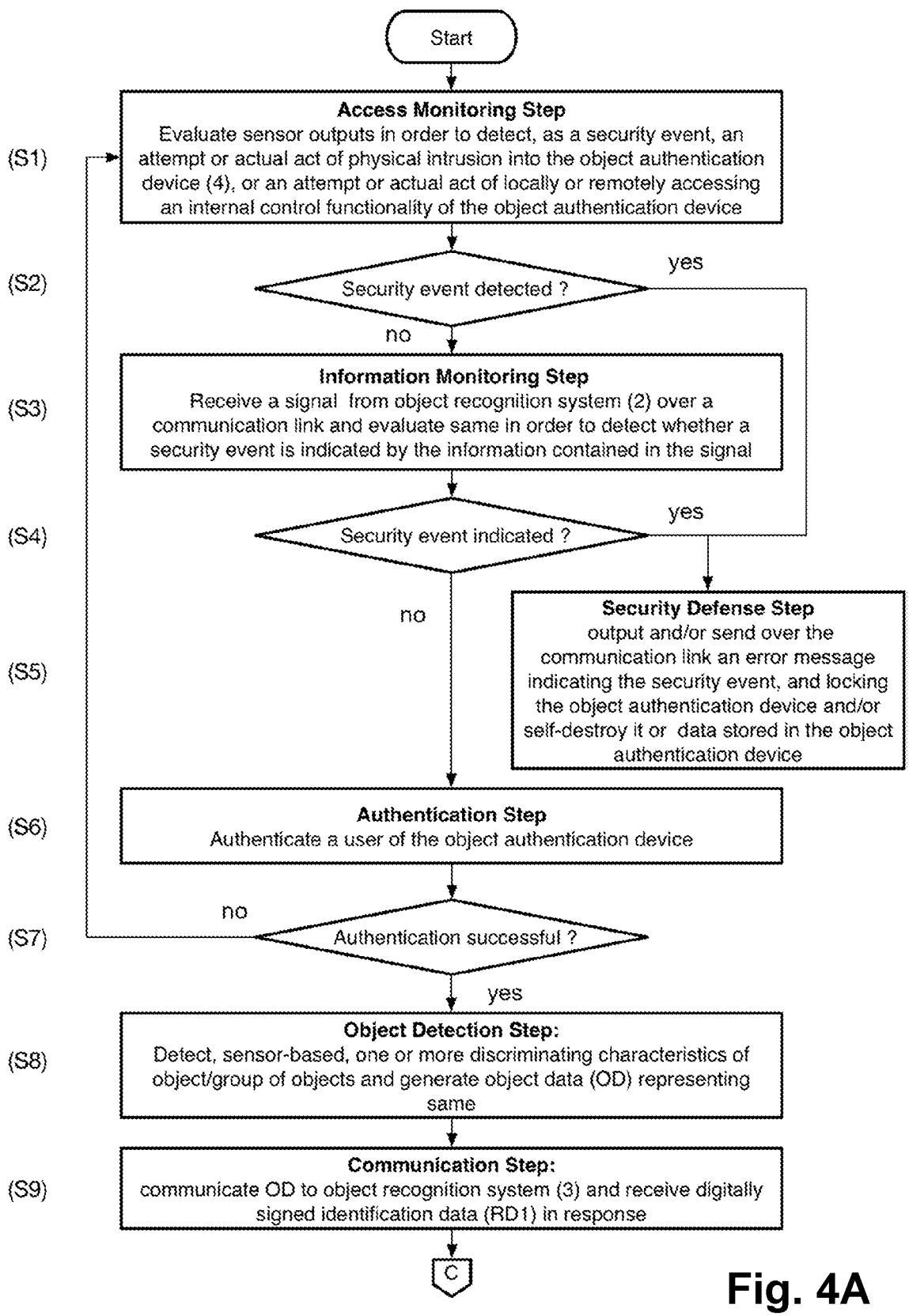
FIGS. 4A and 4B show a flow chart illustrating a method of automatically authenticating an object with an object authentication device, according to a preferred embodiment of the present object authentication solution.
Figure 4B:
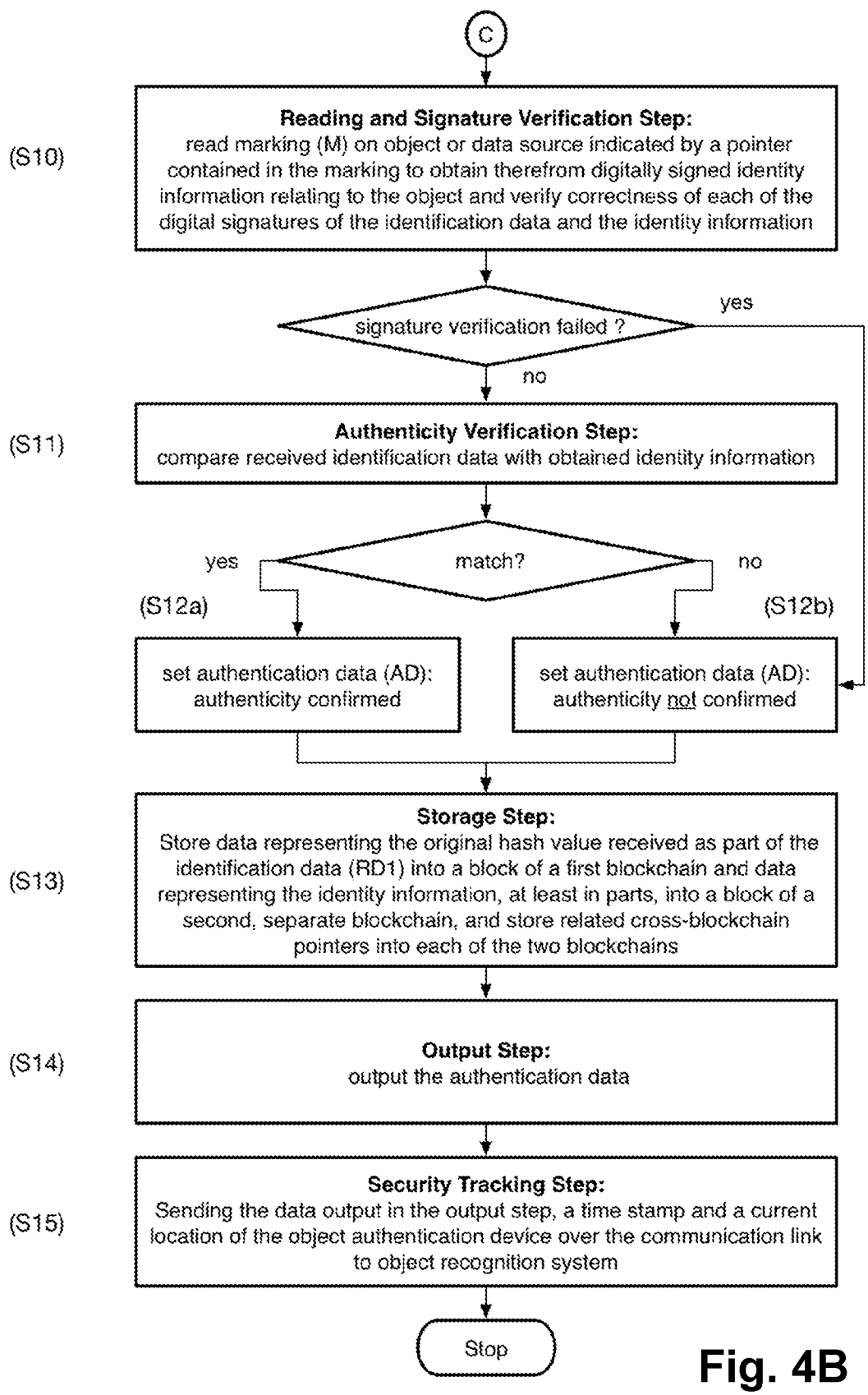

FIGS. 4A and 4B together show a flow chart (split in two parts connected via connector "C") illustrating a preferred embodiment of a method of automatic object authentication with an object authentication device 4 (such as for example device 4-2 discussed above, to which reference is made in the following description of the method), according to a preferred embodiment of the present invention. The method comprises, optionally, a first phase comprising steps S1 to S7, which serve for enhancing the security of an object authentication device itself that performs the method.

Step S1 is an access monitoring step, wherein sensor outputs of sensors within the object authentication device are evaluated, in order to detect, as a security event, an attempt or actual act of physical intrusion into the object authentication device, or an attempt or actual act of locally or remotely accessing an internal control functionality, such as a processing device or communication device, of the object authentication device. If in a further step S2, it is determined that in step S1 a security event was detected (S2; yes), the method performs a security defense step S5 as a final step, wherein an error message indicating the security event is output at a user interface and/or is sent over a communication link to an opposing side, such as a predetermined trust center, which may particularly be identical with or form a part of the system 3 for automatic object recognition shown in FIG. 1. Particularly, it may be implemented as part of the data analysis module 5 or the data processing module 6, or as a separate trust center module (not shown), e.g. a security server, within the system 3. Furthermore, the object authentication device may be locked and/or the object authentication device or at least data stored therein may be self-destroyed in order to avoid unauthorized access to the data or any functionality of the object authentication device. Otherwise (S2; no), the method proceeds to an information monitoring step S3.

In the information monitoring step S3, a signal is received over a communication link, (e.g. Link L1 or L6 in FIG. 1) from a central authority of the object authentication solution, such as a trust center providing a security server (e.g. within system 3) and is evaluated in order to detect whether a security event is indicated by the information contained in the signal. If in a further step S4, it is determined that in step S3 a security event was indicated in the information (S4; yes), the method proceeds to and performs the security defense step S5 as a final step. Otherwise (S4; no), the method proceeds to an authentication step S5.

In the authentication step S5, a user of the object authentication device is authenticated, e.g. via a suitable user interface, such as a keyboard for inputting a password or a fingerprint sensor etc. If in a further step S7, it is determined that the authentication of step S6 failed (S7; no), the method returns to step S7 or, alternatively (not drawn), to the authentication step S6. Otherwise (S7; yes), the method proceeds to a second phase, wherein an object A (or B) to be examined is detected for generating object data OD and outputting same to the system 3.

Accordingly, this second phase comprises an object detection step S8, wherein one or more discriminating characteristics of the examined object (or group of objects, as the case may be) are detected by means of the sensor unit 4c of the object authentication device 4-2 and corresponding object data OD representing these characteristics is being generated.

In the subsequent communication step S9, the generated object data OD is communicated over datalink L1 to the object recognition system 3 in order to enable it to perform the object recognition method described above with reference to FIGS. 3A/3B. Step S9 further comprises receiving over the communication link L6 from the system 3 and in response to said communicating of the OD, the digitally signed identification data included in the reference data subset RD1 resulting from the performing of the object recognition method.

The method further comprises a reading and signature verification step S10, wherein a marking M (specifically a marking $M_A$ for object A) provided on the object to be authenticated is read. Marking M may either itself contain digitally signed identity information relating to the object A, or may, in the alternative, contain a pointer to a data source, such as a server in the Internet, where such information may be accessed. Step S10 further comprises verifying the correctness of each of the digital signatures of the received identification data and the identity information read from the marking M in order to confirm the originality of the respective digitally signed data.

If the signature verification in step S10 fails (S10—yes), the method proceeds to a step S12b, where the authentication data to be output thereafter is set so as to indicate that the authenticity of the examined object could not be confirmed. Otherwise (S10—no), the method proceeds to an authenticity verification step S11, wherein the received identification data (in RD1) is compared with the identity information obtained from the marking M. If as a result of this comparison, it is determined according to the respective predetermined matching criteria, that the identification data matches the identity information (S11—yes), the authentication data to be subsequently output is set in a step S12a such as to indicate that the authenticity of the examined object is confirmed. Otherwise (S11—no), the method proceeds to step S12b already described above.

The method further comprises a storage step S13, in which data representing the original hash value OH received as part of the identification data (in RD1) into a block of a first blockchain of the external data ledger 9 and data representing the identity information, at least in parts, into a block of a second, separate blockchain, which may particularly belong to the same external data ledger 9. As part of the storing, related cross-blockchain pointers are added into each of the two blockchains. The cross-blockchain pointers correspond to each other in the sense that they contain data created and stored at the same authentication event. In particular, the second blockchain might be related to supply-chain information, such as time, location and user identification of the current authentication event. The first blockchain, on the other hand, is used for tracking the authentication information, in particular, whether or not at the current authentication event the physical object bearing the marking M has been successfully authenticated as being original (i.e. not counterfeited or tampered with). In alternative embodiments, the blockchains may be replaced by a blockless distributed ledgers or by a public-private-key (PKI) environment.

The method further comprises an output step S14, which may be performed before, simultaneously or (as drawn) after the storage step S13, wherein the authentication data AD defined in step S12a or S12b, respectively, is output, for example on a user interface of the object authentication device 4 or in a data stream or file provided at an electronic or optical interface of the object authentication device 4. The output data AD being output in step S14 may further comprise all or part of the identification information in RD1 and/or of the identity information read from the marking M. The output data AD may be used for authentication purposes in the field (e.g. at various nodes along a supply chain of products being marked), or even initially at a fabrication or commissioning site, when a physical object is initially marked, in order to verify the marking and in order to capture its content for further use, e.g. for storing it in a database for subsequent authentication purposes.

Furthermore, the method may optionally comprise a security tracking step S15, wherein the authentication data being output in the output step S14 and optionally also a timestamp and/or a current location of the reading event respectively the object authentication device (each of which can be considered security-related information SI) is sent over a communication link to a predetermined central server, which may for example form a part of a trust center, which in turn may again form a part of the system 3 for object recognition, as already described above.

Figure 5:
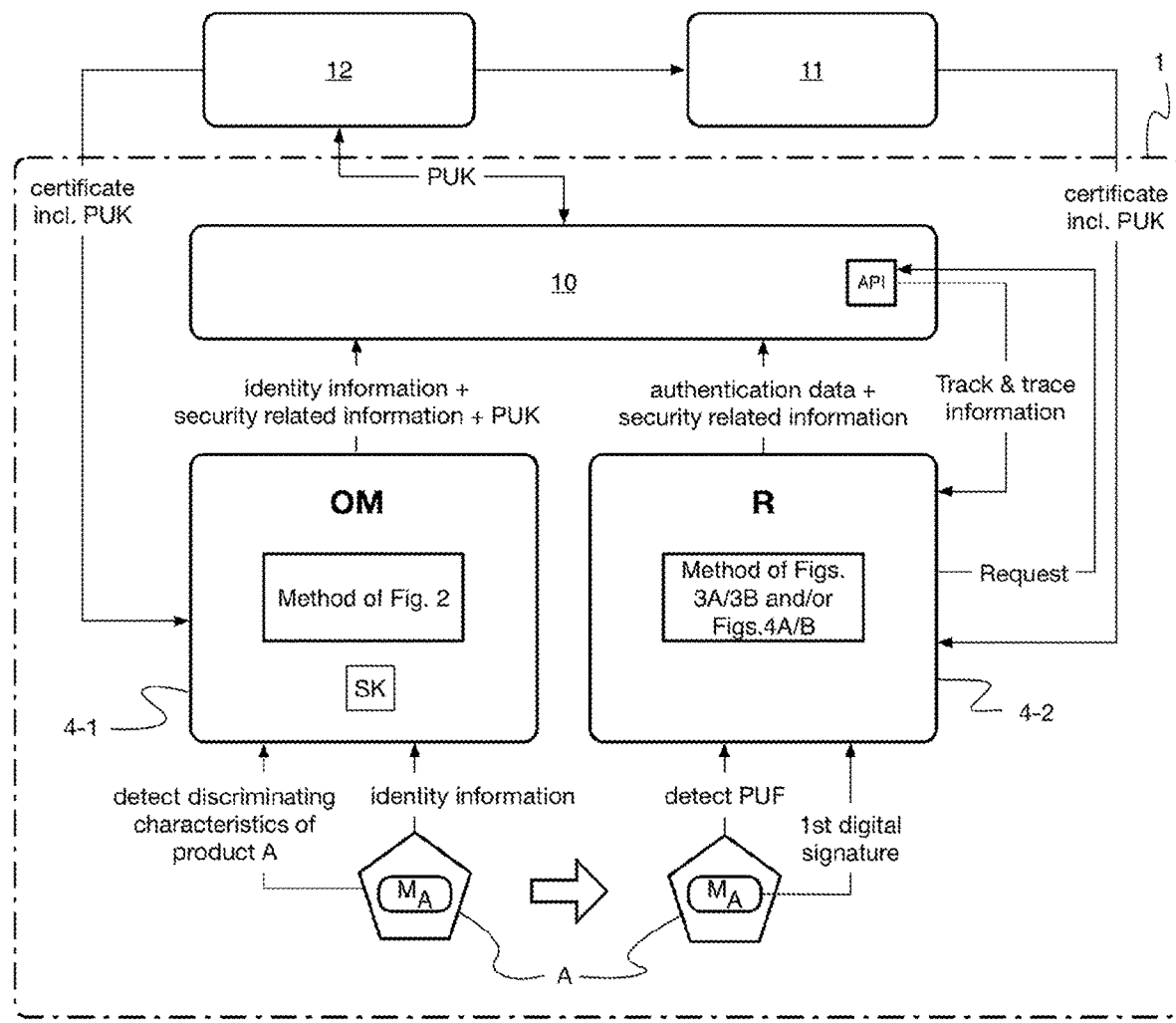
FIG. 5 a schematic overview of a preferred embodiment of the present object authentication solution involving a PKI environment.
Figure 6:
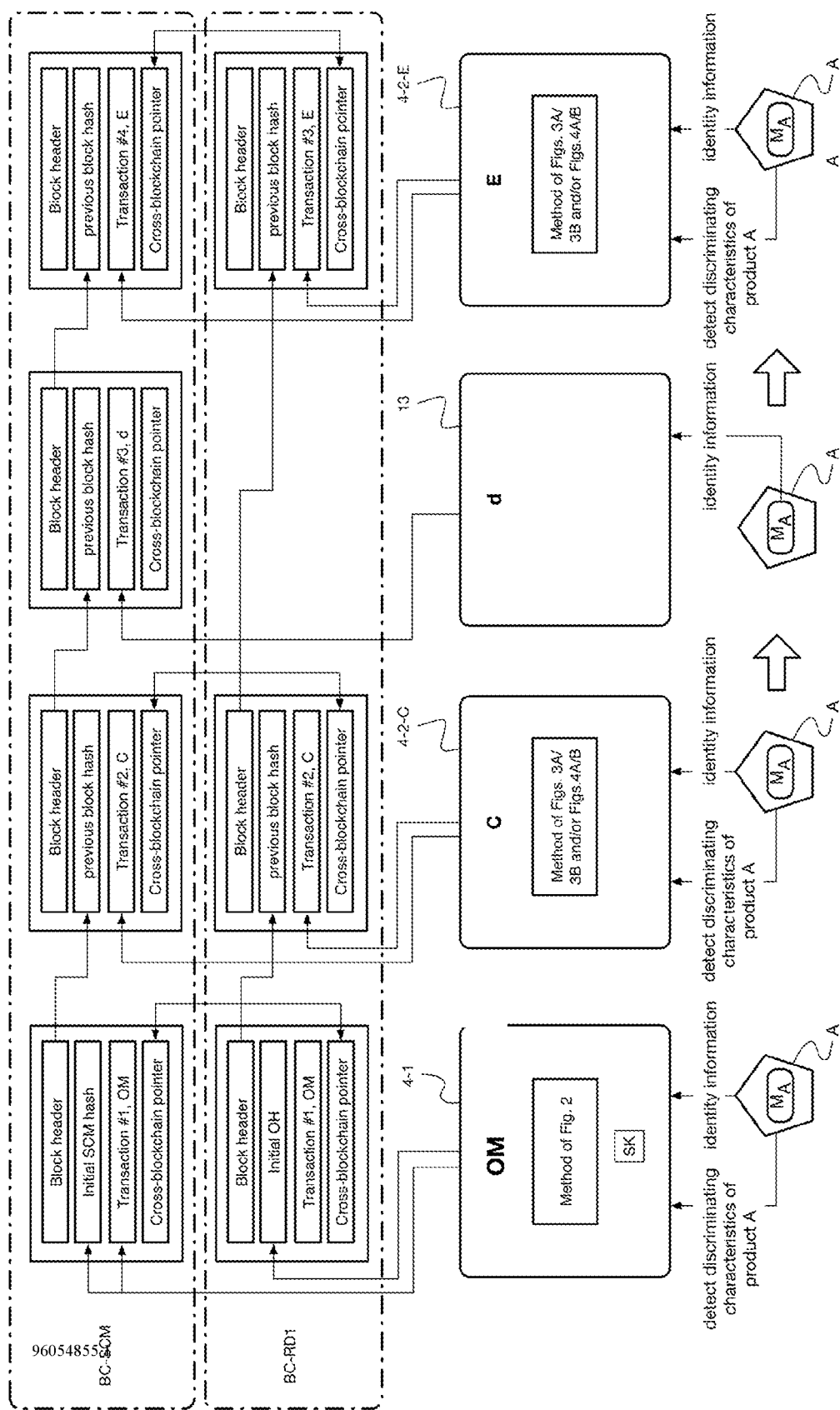
FIG. 6 schematically an evolution of a set of two cross-connected blockchains along a supply chain for a product being marked with a security marking, according to preferred embodiments of the present object authentication solution.

FIGS. 5 and 6 illustrate further preferred security-related aspects of the overall object authentication solution discussed above. In particular, FIG. 5 shows an alternative schematic overview of a basic embodiment of the overall object authentication solution 1 that allows for verifying, at a recipient R participating in a supply chain, whether a product A being marked by a marking M (e.g. per FIG. 2) is original and was in fact provided by the presumed original manufacturer OM positioned upstream in the supply chain.

To that purpose, original manufacturer OM is equipped with an apparatus for applying a marking $M_A$ to a product A being subsequently shipped along the supply chain, as described above with reference to FIG. 2 which comprises or is used in connection with an object authentication device 4 (4-1), such as the one shown in FIG. 1. The marking $M_A$ comprises identity information being equal to or derived from the product-related reference data subset RD1 provided by the system 3 in the course of performing the training method of FIG. 2. The information being represented by the marking $M_A$, including particularly the identity information, is digitally signed with a private key of the manufacturer OM.

Accordingly, the object authentication device 4-2 is configured to detect discriminating characteristics of the product A and to access the identity information comprised in the marking $M_A$. In addition, the object authentication device 4-2 is configured to generate a public/private key pair of an asymmetric cryptography system, store the private key (secure key, SK) in a secured storage space of the object authentication device 4-2 and provide the public key (PUK) along with the identity information and optionally further security-related information, such as the current time and/or location, to a central security server 10 located in a trust center that is entertained by a trusted third party. Accordingly, the trust center plays the role of a registration authority, where public keys of one or more object authentication devices 4 are registered and stored. Preferably, any communication to and from the trust center is protected by encryption, in particular to prevent "man-in-the-middle attacks". In some embodiments, the trust center 10 may form part of the system 3 for object recognition described with reference to FIGS. 1 to 3 and may specifically be implemented as part of its data processing platform 3b. Alternatively, the trust center may form a part or function of the external data ledger 9.

In order to increase the available security level, the public key may be provided to a certification authority of a public key infrastructure (PKI), particularly to a related certification authority server 12, where the public key is certified and included into a cryptographic certificate that is made available to manufacturer OM and a validation authority (server) 11. Now, any further node in the supply chain being equipped with an object authentication device 4 (4-2) as described herein, such as recipient R, can request the certificate from the validation authority 11 to use it for examining the marked product allegedly originating from manufacturer OM for its authenticity. To that purpose, the object authentication device 4-2 at recipient R runs the authentication method of FIGS. 3A/3B and/or FIGS. 4A/B to generate authentication data AD and confirm based thereon that OM was in fact the originator of the product A or, otherwise, that the examined product A or its marking $M_A$ have been counterfeited or otherwise tampered with.

The result of this authentication process, i.e. the authentication data which may optionally further include security-related information, such as the time and location of the authentication process and/or the identity of a user of the object authentication device 4-2 carrying through the authentication, are forwarded to and stored on the central security server 10 of the trust center. This allows for a central monitoring of the supply chain and early identification of any counterfeiting or tampering issues occurring along the supply chain. The central security server 10 may further be configured to generate or consolidate and make available via a data interface API track and trace data reflecting the processing of the product A along the supply chain based on the matching results and security-related information provided by any object authentication devices 4 being involved in the supply chain.

FIG. 6 refers to a further preferred embodiment of the present object authentication solution, wherein blockchain technology is used in order to safely store and make available authentication data AD being generated along the supply chain. Specifically, FIG. 6 schematically illustrates an evolution of a set of two cross-connected blockchains in parallel to a supply chain for a product A being marked with respective marking $M_A$, according to preferred embodiments of the present object authentication solution. Particularly, the embodiments of FIG. 5 and FIG. 6 may be combined within a single solution 1.

The solution of FIG. 6 comprises a first blockchain BC-PUF that is configured to safely store and make available authentication information, in particular original hash values OH derived from various products by way of the training process of FIG. 2, as described herein. In addition, a second blockchain BC-SCM is provided, which is configured to safely store and make available supply-chain information, such as serial numbers of the products, dates and locations of authentications of the products and their markings, etc. Particularly, such supply-chain data may be stored in the second blockchain BC-SCM in the form of or in addition to related hash values being generated from such data by application of a suitable hash function. The two blockchains BC-RD1 and BC-SCM, which are both configured to track the motion of the products along the supply chain, have their related blocks, i.e. the blocks containing data pertaining to the same checkpoint along the supply chain, linked by cross-blockchain pointers, thus providing references from and to corresponding blocks.

At a first node of the supply chain, which is owned by an original manufacturer OM of a product A, this product A is marked with a marking $M_A$, as described herein, e.g. of the kind shown in FIG. 2. Again, an object authentication device 4 (4-1), as described above with reference to FIG. 1, may be used for this purpose. In the course of this marking process, discriminating characteristics of the product A are detected by the object authentication device 4-2 and using the authentication method of FIGS. 3A/3B and/or FIGS. 4A/4B reference data RD1 comprising in particular the original hash value OH of the successfully recognized product A (or an error message ERM in the alternative) are received form system 3. Optionally, this original hash value OH is confirmed by comparing it to a corresponding hash value provided by the marking $M_A$. Then, the hash value OH is stored in a first block of the blockchain BC-RD1 as an initial original hash value as part of a first stored transaction #1 originated by manufacturer OM.

The marking $M_A$ of the product A further comprises a second digital signature that includes a second hash value being derived from supply-chain related data pertaining to manufacturer OM. This second hash value is read from the marking $M_A$, using the object authentication device 4-2, and stored to a first block of the second supply chain BC-SCM as part of a first transaction #1 originated by manufacturer OM, optionally along with further supply-chain related data. Both of these two first blocks contain data corresponding to the initial step of the supply chain being owned by manufacturer OM and accordingly in each of the two blocks a cross-blockchain pointer to the respective corresponding block in the other blockchain is added, in order to allow for cross-referencing.

In a next step along the supply chain, product A reaches a second, intermediate node C, which might for example be owned by logistics company being responsible for the further transportation of the product along the supply chain. Node C is equipped with a further object authentication device 4-2-C and thus performs an examination of the product A by running the method of FIGS. 3A/3B and/or FIGS. 4A/4B on said object authentication device 4-2-C in relation to the marking $M_A$ of product A. If this examination confirms manufacturer OM as the originator of the product A, a respective transaction #2 confirming the positive examination is stored into a second block of the first blockchain BC-RD1. Otherwise, said stored transaction #2 indicates a negative result of the examination, thus indicating a fraud in relation to product A respectively its marking $M_A$. In addition, an alarm or error message may be output, e.g. on a user interface, of the object authentication device 4-2-C, or an alarm/error message might be sent to the central trust center 10 via communication link in order to indicate said negative result.

The second block is cross-linked to the previous, i.e. first, block of said blockchain by addition of the block hash of said previous block. This entry into the first blockchain BC-RD1 confirms that the product A was examined at node C with the respective result. The initial original hash value OH remains available via the cross-link to the first block. Similarly, as in the previous node, supply chain information is generated from the second digital signature of the marking $M_A$ and further data related to the node and stored in the second blockchain BC-SCM as a transaction #2. Also, in this second supply chain BC-SCM, the second block is cross-linked to the previous first block by storing a block hash of said previous block in the second block. Again, a cross-blockchain pointer is added in each of the second blocks to allow for cross-referencing between them.

In a next step along the supply chain, product A reaches a third, intermediate node d, which might for example be a remote logistic station that is not equipped with an object authentication device 4 but instead only with a conventional scanner 13 that is only capable of reading the second digital signature comprised in the marking $M_A$ of product A. Unlike in the previous nodes, at node d only supply chain related data is written to a third block of the second supply chain BC-SCM as a transaction #3, similarly as in node C. However, no data is stored in the first supply chain BC-RD1, as the scanner 13 is not capable of detecting discriminating characteristics of product A and of generating related object data OD.

Finally, in a fourth step along the supply chain, product A reaches node E, which might for example be a final destination or a local retailer of the product A. At this node E, a similar procedure is performed using another object authentication device 4-2-E, as at previous node C and accordingly, similar entries are added to respective further blocks of both blockchains PC-RD1 and BC-SCM.

The two blockchains serve as a safe public ledger of all of said transactions which have ever occurred and have been stored since the initiation of said blockchains. Furthermore, the blockchains provide an extremely high integrity level as they cannot be manipulated (in practice) and thus their use further enhances the security of the overall object authentication solution presented herein. In particular, the data stored in the two block chains can be used to examine both whether manufacturer OM was in fact the originator of product A and whether the supply chain was as expected. This examination can be made at each node OM, C, E along the supply chain that is equipped with an object authentication device 4 and thus can examine both the product A and its marking $M_A$ and access the data stored in the two blockchains.

While above at least one exemplary embodiment of the present object authentication solution has been described, it has to be noted that a great number of variation thereto exists. Furthermore, it is appreciated that the described exemplary embodiments only illustrate non-limiting examples of how the present object authentication solution can be implemented and that it is not intended to limit the scope, the application or the configuration of the herein-described apparatus' and methods. Rather, the preceding description will provide the person skilled in the art with constructions for implementing at least one exemplary embodiment of the solution, wherein it has to be understood that various changes of functionality and the device of the elements of the exemplary embodiment can be made, without deviating from the subject-matter defined by the appended claims and their legal equivalents.

LIST OF REFERENCE SIGNS

1 object authentication solution
2 system for automatic object authentication
3 system for automatic object recognition
3a Recognition subsystem
3b data processing platform
4 object authentication device
4-1 central object authentication device of System 2
4-2 field object authentication device
4a sensor unit of object authentication device
4b processing unit of object authentication device
4c memory of object authentication device
4d security device
4e security defense arrangement
4f monitoring device
5 machine-learning-based data analysis module
5a processing unit of data analysis module
5b memory of data analysis module
6 data processing module
6a processing unit of data processing module
6b memory of data processing module
7 first data repository
8 second data repository
9 external data ledger, e.g. blockchain or blockless distributed ledger or PKI environment
10 central security server
11 validation authority (server)
12 certification authority server
13 scanner
A, B (physical) objects to be authenticated
A1 consumable goods, e.g. a set of pharmaceutical tablets arranged in blister packs
A2 product packaging, esp. packaging for the blister packs of A1
API data interface of trust center
AV1 first adjunct value
AV2 second adjunct value
BC-RD1 first block chain for reference data
BC-SCN second block chain for supply chain data
C, d, E nodes of supply chain
CD( ) data combination function
DD discriminating data
ERR error signal ERM error message
ID identification data
IN index
L1-L6 secured data links
M, $M_A$ $M_B$ markings
MD meta data
OD object data
ODD original discriminating data
OH original hash value
OM original manufacturer
PUK public key
PRD2 previous second subset of reference data
R Recipient, e.g. customer along supply chain
RD1 first subset of reference data, including identification data
RD2 second subset of reference data
SI supplementary information
SK secure (private) key

The invention claimed is:

1. A method of training a system for automatic object recognition, the method comprising:
receiving object data representing one or more discriminating characteristics of a physical object or group of physical objects;
processing the object data by means of a machine-learning-based object recognition process to obtain original discriminating data by generating, by means of performing one or more predefined modification operations, a plurality of collision resistant virtual representations of said physical object or group of physical objects, such that at least two of these virtual representations represent the same physical object or group of physical objects, but each at a different condition, wherein said different conditions relate to different age points that represent aging effects in a lifetime of said physical object or group of physical objects; and
storing reference data comprising the original discriminating data and an original hash value derived therefrom by application of a pre-determined cryptographic hash function thereto into one or more data repositories with restricted access.

2. The method of claim 1, wherein storing the reference data comprises storing the original discriminating data into a first one of the data repositories and storing identification data comprising the original hash value into a separate second one of the data repositories such that neither the first nor the second data repository stores both the original discriminating data and the corresponding original hash value.

3. The method of claim 1, wherein storing the reference data comprises storing combined data, which is formed as a combination of the reference data and an additional adjunct value, which is defined independent from said reference data, into the one or more data repositories with restricted access.

4. The method of claim 1, further comprising iteratively re-training the system for automatic object authentication based on additional object data representing discriminating characteristics of the physical object or group of physical objects, for which respective original reference data has already been previously generated and stored in the one or more data repositories during a previous iteration step of training the system, wherein the additional object data serves as input data for said machine-learning-based object recognition process.

5. The method of claim 1, wherein storing the reference data comprises one or more of the following steps:
storing the reference data in a digitally signed form into at least one of said data repositories;
storing or causing one or more nodes of a blockchain environment to store the identification data in a digitally signed form into a block of a blockchain related to said blockchain environment;
storing or causing one or more nodes of a blockless distributed ledger environment to store the identification data in a digitally signed form into at least one node of said blockless distributed ledger environment;
storing the identification data in a digitally signed form into a storage of a public/private-key environment.

6. The method of claim 1, wherein the method is performed by a system comprising two or more separate devices, which collectively perform the method, and which are communicatively connected to each other by one or more data links being protected against unauthorized interception.

7. A system for automatic object recognition, the system being configured to perform the method of claim 1.

8. A non-transitory computer-readable medium having stored thereon computer-executable instructions which, when executed on one or more processors of a system for automatic object recognition, causes the system to perform the method according to claim 1.

9. The method of claim 1, wherein said different conditions further relate to different environmental conditions to which said physical object or group of physical objects might be exposed during a detection of respective one or more discriminating characteristics thereof in a subsequent object authentication process.

* * * * *